(12) United States Patent
White

(10) Patent No.: US 9,803,794 B2
(45) Date of Patent: Oct. 31, 2017

(54) THEFT RESISTANT UPSTANDING MOUNT FOR TEMPORARY SUPPORT OF COSTLY EQUIPMENT LIKELY TO BE A TARGET FOR THEFT

(71) Applicant: Franklin B White, Port St. Lucie, FL (US)

(72) Inventor: Franklin B White, Port St. Lucie, FL (US)

( * ) Notice: Subject to any disclaimer, the term of this patent is extended or adjusted under 35 U.S.C. 154(b) by 0 days.

(21) Appl. No.: 15/530,341

(22) Filed: Dec. 27, 2016

(65) Prior Publication Data
US 2017/0114946 A1 Apr. 27, 2017

Related U.S. Application Data

(63) Continuation of application No. 14/544,686, filed on Feb. 5, 2015, now Pat. No. 9,534,731, which is a
(Continued)

(51) Int. Cl.
*F16M 11/04* (2006.01)
*F16M 11/14* (2006.01)
(Continued)

(52) U.S. Cl.
CPC ............. *F16M 11/14* (2013.01); *E02F 9/261* (2013.01); *E04H 12/003* (2013.01);
(Continued)

(58) Field of Classification Search
CPC ..... E04H 2/0031; E04H 12/003; G01C 15/00; F16M 11/14; F16M 2200/024;
(Continued)

(56) References Cited

U.S. PATENT DOCUMENTS

| 197,369 | A | * | 11/1877 | Hoffman | ................ | F16M 11/12 |
|---|---|---|---|---|---|---|
| | | | | | | 248/180.1 |
| 202,916 | A | * | 4/1878 | Young | .................... | F16M 11/12 |
| | | | | | | 248/180.1 |

(Continued)

FOREIGN PATENT DOCUMENTS

| DE | 2840059 A1 | * | 3/1980 | ............. | F16M 11/14 |
|---|---|---|---|---|---|
| DE | 102011101110 A1 | * | 11/2012 | ............. | F16M 11/14 |

(Continued)

*Primary Examiner* — Eret McNichols
(74) *Attorney, Agent, or Firm* — David A. Burge

(57) ABSTRACT

A telescopically extensible upstanding mast carries an upper mounting station near an upper end of the mast, a lower mounting station near the lower end of the mast, and an intermediate mounting station, located along the mast inbetween the lower and upper mounting stations, with each mounting station being independently lockable to releasably retain a separate costly equipment device. The upper mounting station has a threaded formation that is normally freewheeling until a shrouded rotation control prevents the formation from turning so a costly equipment device can be threaded onto and off of the threaded formation. The intermediate and lower mounting stations each have removable and non-removable members that can be locked together to releasably retain costly equipment devices.

12 Claims, 11 Drawing Sheets

Related U.S. Application Data continuation-in-part of application No. 29/463,908, filed on Apr. 2, 2014, now Pat. No. Des. 731,872.

(60) Provisional application No. 61/965,784, filed on Feb. 8, 2014.

(51) Int. Cl.

| | | |
|---|---|---|
| *F16M 13/02* | (2006.01) | |
| *F16M 11/28* | (2006.01) | |
| *G01C 15/00* | (2006.01) | |
| *E04H 12/00* | (2006.01) | |
| *E02F 9/26* | (2006.01) | |
| *F16M 11/12* | (2006.01) | |
| *F16M 11/20* | (2006.01) | |
| *E05B 67/38* | (2006.01) | |

(52) U.S. Cl.
CPC ........... *E05B 67/383* (2013.01); *F16M 11/04* (2013.01); *F16M 11/12* (2013.01); *F16M 11/2064* (2013.01); *F16M 11/28* (2013.01); *F16M 13/02* (2013.01); *G01C 15/00* (2013.01); *F16M 2200/024* (2013.01); *F16M 2200/028* (2013.01)

(58) Field of Classification Search
CPC ........ F16M 13/02; F16M 11/28; F16M 11/12; F16M 11/2064; F16M 11/04; E02F 9/261
USPC ............... 248/177.1, 178.8, 180.1, 188.1
See application file for complete search history.

(56) References Cited

U.S. PATENT DOCUMENTS

| | | | | | |
|---|---|---|---|---|---|
| 209,562 | A * | 11/1878 | Gurley | ............... | F16M 11/14 248/181.1 |
| 687,183 | A * | 11/1901 | Kolander | ............ | F16C 11/0633 248/181.1 |
| 1,151,549 | A * | 8/1915 | Schade | .................. | F16M 11/12 248/180.1 |
| 1,288,461 | A * | 12/1918 | Akeley | .................. | F16M 11/14 248/181.1 |
| 1,846,382 | A * | 2/1932 | Bing | ..................... | F16M 11/041 248/187.1 |
| 1,894,456 | A * | 1/1933 | Zerk | ..................... | F16M 11/10 248/181.1 |
| 2,408,343 | A * | 9/1946 | Rothweiler | .............. | G01C 9/28 248/180.1 |
| 2,541,434 | A * | 2/1951 | Nelson | ..................... | E06C 7/14 192/105 BB |
| 2,572,468 | A * | 10/1951 | Gibson | ................. | F16M 11/14 248/181.2 |
| 2,672,313 | A * | 3/1954 | Poole | ..................... | F16M 11/14 248/182.1 |
| 2,775,423 | A * | 12/1956 | Strass | ..................... | G01C 1/02 235/60.2 |
| 3,021,601 | A * | 2/1962 | Hayes | ..................... | E01B 35/08 248/214 |
| 3,527,435 | A * | 9/1970 | Yorkins | ................. | H01Q 1/125 248/184.1 |
| 3,737,130 | A * | 6/1973 | Shiraishi | .............. | F16M 11/048 248/181.1 |
| 3,808,851 | A * | 5/1974 | Kargus | ............... | E05B 73/0076 70/232 |
| 4,076,158 | A * | 2/1978 | Barr | ..................... | B62D 43/08 224/403 |
| 4,244,547 | A * | 1/1981 | Kooi | ..................... | G01D 11/30 248/180.1 |
| 4,249,832 | A * | 2/1981 | Schmanski | ........... | E01F 9/669 256/13.1 |
| 4,308,733 | A * | 1/1982 | Tampa | ..................... | B62D 43/00 224/42.24 |
| 4,358,941 | A * | 11/1982 | Zimmer | ................. | E05B 67/36 285/80 |
| 4,423,850 | A * | 1/1984 | Bass | ..................... | F16M 11/125 248/180.1 |
| 4,444,031 | A * | 4/1984 | Watson | ................. | A01K 97/06 70/232 |
| 4,736,603 | A * | 4/1988 | Brushaber | ........... | E05B 73/0076 109/64 |
| 4,751,831 | A * | 6/1988 | Morris, Jr. | ........... | E05B 65/0089 70/159 |
| 4,926,561 | A * | 5/1990 | Miller | ................... | G01C 15/06 33/293 |
| 4,957,317 | A * | 9/1990 | Jakubas | ................ | B65D 55/14 292/256.67 |
| 5,015,119 | A * | 5/1991 | Schmanski | ............. | E01F 7/06 256/13.1 |
| 5,141,119 | A * | 8/1992 | Milazzo | ................ | B60R 25/007 212/290 |
| 5,249,766 | A * | 10/1993 | Vogt | ..................... | F16C 11/106 248/181.1 |
| 5,418,609 | A * | 5/1995 | Dunne | ..................... | G01C 1/02 248/162.1 |
| 5,426,963 | A * | 6/1995 | Tafoya | ................ | B62D 43/007 224/42.21 |
| 5,447,044 | A * | 9/1995 | Cheng | ................. | E05B 73/0005 248/552 |
| 5,567,939 | A * | 10/1996 | Hong | ..................... | F16M 11/14 250/338.1 |
| 5,614,918 | A * | 3/1997 | Dinardo | ................ | F16M 11/14 248/181.1 |
| 5,722,268 | A * | 3/1998 | Choi | ................... | E05B 73/0082 248/553 |
| 5,749,549 | A * | 5/1998 | Ashjaee | ................ | F16M 11/14 248/168 |
| 5,760,748 | A * | 6/1998 | Beckingham | .......... | H01Q 1/125 248/177.1 |
| 5,769,370 | A * | 6/1998 | Ashjaee | ................ | F16M 11/14 248/168 |
| 5,878,519 | A * | 3/1999 | Huyck, Jr. | ............. | E01F 9/669 248/214 |
| D420,566 | S * | 2/2000 | Ely | ..................... | D8/354 |
| 6,109,077 | A * | 8/2000 | Lee | ..................... | E05B 73/0005 70/232 |
| 6,324,024 | B1 * | 11/2001 | Shirai | .................. | G01C 15/002 356/4.01 |
| 6,439,515 | B1 * | 8/2002 | Powers | .................. | F16M 11/28 248/129 |
| 6,951,434 | B2 * | 10/2005 | Yodock, Jr. | ............. | E01F 13/02 404/6 |
| 6,983,916 | B2 * | 1/2006 | Raynaud | .............. | F16M 11/046 248/163.2 |
| 7,069,680 | B1 * | 7/2006 | Crawford | ............... | G09F 7/18 24/502 |
| 7,281,693 | B2 * | 10/2007 | Chou | ..................... | F16M 11/14 248/179.1 |
| 7,320,450 | B2 * | 1/2008 | Carnevali | .............. | F16M 11/40 248/121 |
| D576,062 | S * | 9/2008 | Hayamizu | ..................... | D10/66 |
| 7,748,669 | B2 * | 7/2010 | Lu | .......................... | F16M 11/14 248/181.1 |
| 8,025,262 | B2 * | 9/2011 | Yamaguchi | ............ | F16M 11/14 248/176.1 |
| 8,061,920 | B2 * | 11/2011 | Wimberley | ............ | F16M 11/14 248/181.1 |
| 8,104,723 | B2 * | 1/2012 | Parham | .................. | G01C 15/00 248/176.1 |
| 8,123,427 | B2 * | 2/2012 | Vogt | ..................... | F16C 11/106 403/137 |
| 8,419,309 | B2 * | 4/2013 | Wimberley | ............ | F16M 11/14 248/181.2 |
| D695,592 | S * | 12/2013 | White | ........................ | D8/354 |
| 8,640,370 | B2 * | 2/2014 | Mandl | ..................... | G09F 7/20 116/63 P |
| 8,747,418 | B2 * | 6/2014 | Qureshi | ................ | F16M 11/14 248/161 |
| D735,595 | S * | 8/2015 | White | ........................ | D10/74 |

(56) References Cited

U.S. PATENT DOCUMENTS

| | | | | |
|---|---|---|---|---|
| 9,163,774 B2 * | 10/2015 | Orlov | | F16M 7/00 |
| 9,534,731 B2 * | 1/2017 | White | | F16M 13/02 |
| 2004/0197140 A1 * | 10/2004 | Maleska | | E01F 15/083 |
| | | | | 404/6 |
| 2005/0045783 A1 * | 3/2005 | Brumley | | B23K 37/0452 |
| | | | | 248/181.1 |
| 2005/0057745 A1 * | 3/2005 | Bontje | | G01C 15/002 |
| | | | | 356/139.03 |
| 2005/0135878 A1 * | 6/2005 | McNally | | E01F 13/022 |
| | | | | 404/6 |
| 2006/0000957 A1 * | 1/2006 | Carnevali | | F16M 11/14 |
| | | | | 248/181.1 |
| 2008/0084147 A1 * | 4/2008 | Brown | | A47B 83/001 |
| | | | | 312/223.3 |
| 2008/0307684 A1 * | 12/2008 | Ulloa | | G09F 7/18 |
| | | | | 40/607.1 |
| 2010/0005690 A1 * | 1/2010 | Mavis | | G09F 7/22 |
| | | | | 40/1 |
| 2011/0252655 A1 * | 10/2011 | Cline | | G01C 15/00 |
| | | | | 33/228 |
| 2012/0203377 A1 * | 8/2012 | Paydar | | G01K 3/005 |
| | | | | 700/232 |
| 2012/0204454 A1 * | 8/2012 | Larsen | | G09F 21/04 |
| | | | | 40/591 |
| 2013/0163978 A1 * | 6/2013 | Carlesso | | F16M 11/14 |
| | | | | 396/428 |
| 2013/0265780 A1 * | 10/2013 | Choksi | | F21V 21/145 |
| | | | | 362/373 |
| 2014/0314520 A1 * | 10/2014 | Friedman | | F16B 37/14 |
| | | | | 411/367 |
| 2015/0023009 A1 * | 1/2015 | White | | G09F 21/04 |
| | | | | 362/183 |
| 2015/0292226 A1 * | 10/2015 | White | | F16B 7/105 |
| | | | | 211/4 |
| 2016/0025258 A1 * | 1/2016 | Shannahan | | F16M 11/043 |
| | | | | 29/825 |
| 2016/0076885 A1 * | 3/2016 | Nishita | | G01C 15/008 |
| | | | | 33/292 |
| 2016/0086525 A9 * | 3/2016 | White | | G09F 21/04 |
| | | | | 362/183 |
| 2016/0312967 A1 * | 10/2016 | Harvey | | F21V 17/007 |

FOREIGN PATENT DOCUMENTS

| | | | | |
|---|---|---|---|---|
| DE | 102011110428 B3 * | 11/2012 | | F16M 11/14 |
| DE | 102013004952 A1 * | 3/2014 | | F16M 11/14 |
| DE | 102013006617 A1 * | 10/2014 | | G03B 17/561 |
| EP | 1939518 A1 * | 7/2008 | | F16M 11/14 |
| FR | 2354505 A1 * | 1/1978 | | F16M 11/10 |
| GB | 191411712 A * | 0/1915 | | F16M 11/16 |
| GB | 666821 A * | 2/1952 | | B65D 55/14 |

* cited by examiner

THEFT RESISTANT UPSTANDING MOUNT FOR TEMPORARY SUPPORT OF COSTLY EQUIPMENT LIKELY TO BE A TARGET FOR THEFT

CROSS-REFERENCE TO RELATED PATENTS AND APPLICATIONS

This application is a continuation of Utility application Ser. No. 14/544,686 filed Feb. 5, 2015 scheduled to issue Jan. 3, 2017 as U.S. Pat. No. 9,534,731 to Franklin B. White, which Utility Application claims the benefit of the filing date of Provisional Application Ser. No. 61/965,784 filed Feb. 8, 2014.

Said Utility application Ser. No. 14/544,686 is a continuation-in-part of Design Application Serial No. 29/463,908 filed Apr. 2, 2014 which issued Jun. 16, 2015 as Design Pat. No. D-731,872 to Franklin B. White.

REFERENCE TO SUBJECT-MATTER-RELATED PATENT & APPLICATION

Reference is made to Design Pat. No. D-701,107 issued Mar. 18, 2014 from Design Application Serial No. 29/395,835 filed Apr. 6, 2012 which issued Mar. 18, 2014 as Design Pat No. D-701,107 to Franklin B. White.

The disclosures of all of the above patents and applications are incorporated herein by reference.

BACKGROUND

This invention relates to theft resistant, upstanding mounts for adjustably supporting costly devices at selected above-ground heights at temporary locations that often are left unattended even during work days.

Costly devices such as compact electronic devices that need to be supported at above-ground heights, often on a temporary basis, are made by many entities. Typical of such costly devices are compact electronic devices that monitor and at least partially control the operation of heavy duty excavation and earth moving equipment at large outdoor construction sites.

Many sizable outdoor construction projects no longer make labor intensive use of surveyors and others who aid in determining the elevations and present positions of soil, rock and other landmarks—or are used in determining what soil, rock and other material needs to be repositioned, added or hauled away. When sites for roadbeds, bridges, cloverleaf s, parking lots, new buildings and the like are to be cleared, excavated and otherwise prepared for construction work that is to follow, drones of ever-increasing sophistication often are being used to acquire job site data in a fraction of the time it took survey crews to collect and correlate site data only a few years ago.

By making use of drone-collected data, combined with other information, as inputs to computer-aided design (CAD) software, a three-dimensional (3D) model can be generated of a site. Such a 3D model can then be conveyed to a costly wireless electronic device positioned atop an upstanding support in a CAD file to enable that device to monitor and at least partially control large excavation equipment such as bulldozers and road graders to perform such work as needs to be carried out at the job site in preparation for construction work to follow. Large scale outdoor work that only a few years ago was still quite labor intensive is increasingly being automated.

The out-of-the-way locations where the costly wireless electronic devices need to be temporarily positioned (so the costly devices and their upstanding supports do not interfere with movements of excavation equipment) to communicate properly with such excavation equipment being controlled by the devices often are unattended much of each workday, and at other times.

By way of example, Thimble Navigation Limited of Subnormal, Calif., sells costly, compact, wireless electronic control units for monitoring and controlling large excavation equipment such as bulldozers and road graders. The Thimble units are variously known as "Universal Total Station systems," or as "Robotic Total Stations" (often referred to hereinafter as "systems or units").

Thimble Total Station systems or units are used quite widely by thousands of sizable excavation and construction companies to aid with the layout, progressive grading, and final grading of roadbeds, bridges, clover-leafs, parking lots, new building sites, and the like—sites where compact yet costly devices such as Thimble Total Station systems or units need to be temporarily, adjustably positioned atop some sort of upstanding mounts—typically mounts that have, in some way, been extended to selected above-ground heights.

A typical Thimble Total Station system or unit is a compact, smaller-than-briefcase-size, relatively lightweight, easy-to-carry electronic device that easily may cost $35,000 or more. In essence, a 3D model of an associated job or project is described in detail in a CAD file that is loaded into the system or unit. The CAD file is combined with other programming and information that also may be loaded into the system or unit to let the system or unit know precisely what must be done, and how it must be done, so the system or unit can accomplish the associated job or project—for example, by controlling excavation and construction equipment to remove or reposition or supplement existing soil, rock and other materials at, to or from specific locations.

In use, a Thimble Total Station system or unit is supported atop an upstanding mount at a suitable out-of-the-way outdoor location where the system or unit can wireless's transmit data and commands that enable the system or unit to monitor the work of, and to at least partially control the operation of an associated piece of construction and/or excavation equipment such as a road grader, a bulldozer, an excavator or the like. Each Total Station system or unit is said to be "married to" an associated piece of construction and/or excavation equipment—so that the equipment to which the system is married can perform such tasks as are needed to advance, and eventually to accomplish, the associated job or project.

Understandably, these compact but costly, lightweight and easy to carry Thimble systems or units (and other similar costly devices that may need to be supported at outdoor locations that often are left unattended even during busy workdays), have frequently become targets for theft by those who are inclined to stealthily grab one of these quite costly systems or units, and hustle away with it—so that it typically can be put to use at another job site—even a job site that may be fairly near to where the system or unit was stolen.

When one of the Total Station systems or units has suddenly "gone missing" at a job site, associated components of a Thimble controlled job site immediately become disabled and are nearly useless. Wireless receivers costing $55,000 or more carried on heavy construction and excavation equipment, to say nothing of the very costly construction and excavation equipment itself, are suddenly and unexpectedly rendered useless—until the stolen Total Station system or unit can be replaced and loaded with the appropriate 3D model so needed work can resume at the associated job site.

The problem of theft of costly equipment supported at elevated attitudes at unmanned, outdoor locations is very real. Indeed, the problem has become far more significant than one might think possible. There is hardly a sizable earthwork contractor in business today who has not had one or more of the costly Thimble Total Station systems or units stolen by snatch and grab thieves. One contractor in the Tampa area recently had 7 of his Thimble Total Station systems or units stolen during the same day—all at times while the systems or units were in operation monitoring and controlling associated construction and/or excavation equipment at active job sites.

Construction contractors have tried to use a variety of theft prevention measures to keep costly devices such as Thimble Total Station systems or units from being stolen. Typically, a Total Station system or unit is supported at a selected height and in a temporary, out-of-the-way location (where an unneeded vehicle can also be parked)—with the location being chosen to enable the system or unit to communicate adequately with and to control associated construction and/or excavation equipment that will be operating within a few miles of the system or unit which is tethered by a stout cable to the bumper of a vehicle parked at the chosen location. The often quiet, unattended and out-of-the-way outdoor locations chosen to temporarily position Total Station systems and units have been known to encourage would-be thieves who dash from a get-away vehicle waiting nearby with its engine running so they can use bolt cutters or battery-operated portable grinding equipment to quickly sever stout tether cables. Within a matter of a few seconds, a total station system or unit can be cut loose and spirited away by thieves who sometimes drop their bolt cutters or other cutting equipment as they focus on quickly grabbing an unlettered system or unit, and escape in their waiting get-away cars.

As the foregoing explains, there exists a need for a mount that can be moved from one temporary location to another, and that can provide superior theft resistant support for costly devices positioned atop the mount, especially when the temporary locations are left unattended.

Another problem with positioning costly devices at a sequence of temporary job sites has to do with the condition and character of the ground surfaces at these sites. The ground may have been recently cleared of trees and brush, and may be so disturbed that it is unstable, often is quite uneven, and may cause whatever is situated atop the ground surface to tilt—so that relatively tall, upstanding mounts of one kind or another that are temporarily positioned at such sites for supporting costly devices such as Thimble systems and units are forced (by underlying ground surfaces that are uneven, unstable and less than level) to extend upwardly along axes that deviate significantly from true vertical. Hence, a need exists for a secure upstanding mount that can be moved from place to place, and that often can overcome the problem of disturbed ground surfaces tending to cause instability at such sites as have been selected for temporary positioning of such costly devices.

Yet another problem encountered in positioning costly devices for operation at elevated heights and in a series of temporary locations is that the devices themselves need to be properly leveled where positioned for use. While some costly devices are provided with on-board leveling mechanisms that permit the nearly level attitudes of the costly devices to be fine-tuned, seldom, if ever, are such devices provided with leveling mechanisms that are capable of compensating for supports that mount the costly devices at attitudes significantly tilted from level. Hence, a need exists for a secure upstanding mount that can be moved from one desired temporary location to another, with the mount itself having an on-board mechanism that enables a costly device carried atop the mount to be supported in a level orientation even if the mount itself has an upstanding mast that deviates significantly from true vertical.

SUMMARY OF THE INVENTION

The present invention addresses the need to provide upstanding mounts for adjustably supporting, with good stability, costly devices at selected above ground heights, in a superior theft resistant manner, at temporary outdoor locations that often are left unattended.

In some embodiments, the mounts include telescopically extensible mast structures that extend upwardly to properly operationally support at appropriate above-ground heights, costly devices that are carried atop the mast structures. The considerable size and awkward-to-move configurations taken on by the mounts when the mast structures are extended and securely locked in position constitute significant deterrents to theft of costly devices locked atop the mast structures if would-be thieves approach the challenge of gaining possession of the costly devices by carting away the costly devices together with the unwieldily upstanding mounts to which the costly devices are securely connected.

In some embodiments, lockable connections of novel character are provided not only between adjacent components of the mounts, but also between the mounts and such costly devices as are carried atop the mounts—so that gaining possession of the costly devices by a disassembly attack on the any component of the apparatus that includes the mount and a costly device supported atop the mount is discouraged by the novel and locked nature of the connections that join components of the apparatus, and by the time, effort, and resources required to defeat the locked connections.

In some embodiments, upstanding mounts are provided with, or are securely connectable to, quite massive base structure components—so that the quite massive size and weight of apparatus that includes the massive base structures and the upstanding mounts attached thereto discourages attempts to gain possession of such costly devices as are locked in place atop the mounts if would-be thieves consider carting away the fully assembled mounts together with the costly devices securely locked in place atop the mounts. Moreover, the extraordinary weight of the massive base structures can also aid in enhancing the stability with which costly devices are supported—by serving to compact disturbed soil underlying the base structures.

In some embodiments, costly devices are coupled to upstanding mounts by secure swivel connections that permit the costly devices to be roughly leveled for proper operation even though the longitudinal axes of the upstanding mast assemblies of the mounts may deviate quite significantly from optimum, true vertical orientations. Once the costly devices have been roughly leveled through use of swivel connections that preferably include spherical bearings, the roughly level orientations provided by the swivel connections are retained while fine tuning, as a second step of the leveling process is can be attended to through use of leveling assemblies provided atop, and separate from, the spherical bearings.

In some embodiments, adjustable connections that would-be thieves are likely to attempt to disassemble (in the belief that all adjustable connections are vulnerable to attack by disassembly) are defeated by the adjustable connections that are, in fact, designed to provide strong points that strongly resist disassembly.

BRIEF DESCRIPTION OF THE DRAWINGS

Other features and advantages of such upstanding mounts as are disclosed herein will become apparent from the description and claims that follow, taken together with the accompanying drawings, wherein:

DETAILED DESCRIPTION

Figure 1:
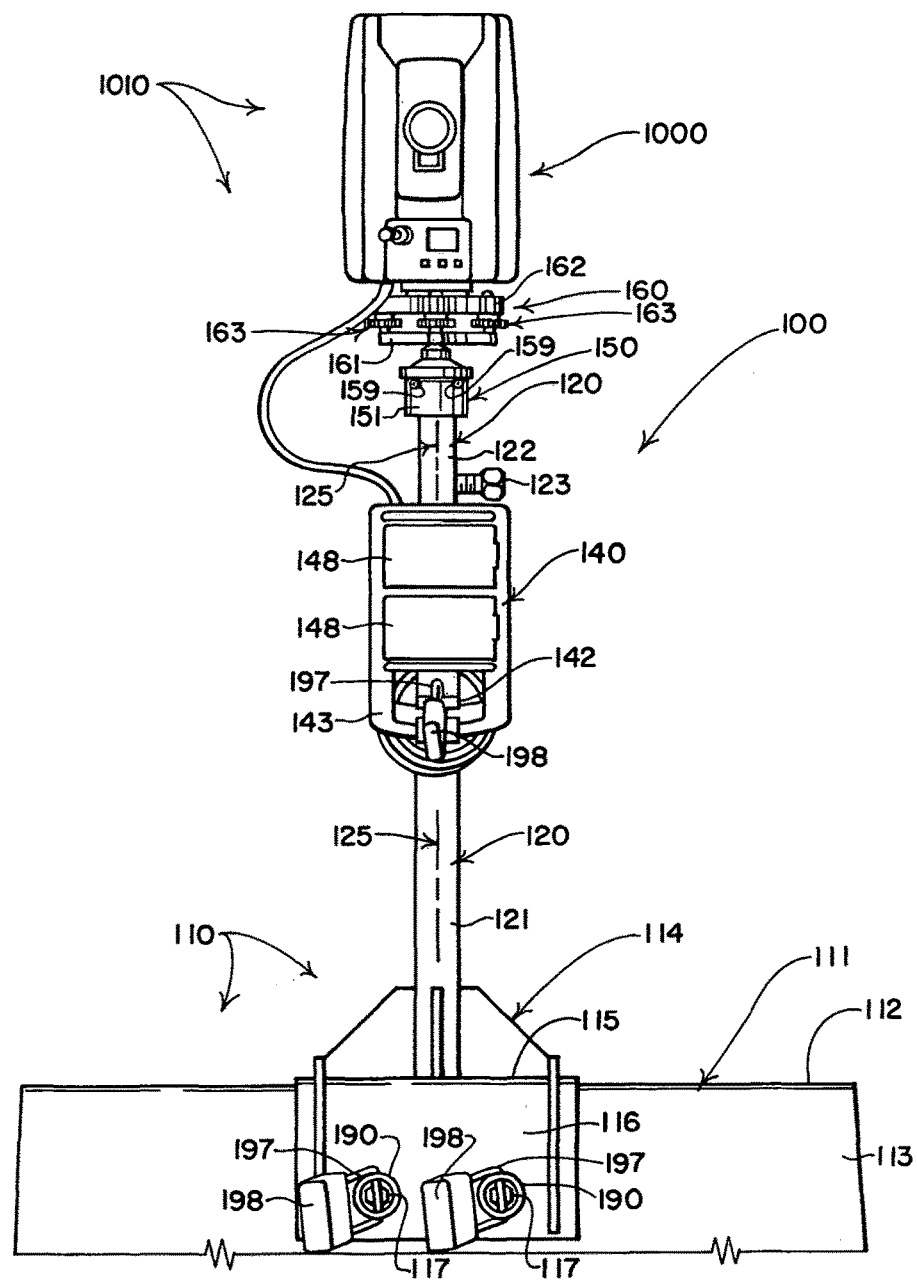
FIG. 1 is a front view of an apparatus that includes a preferred embodiment of upstanding mount having an example of a costly device locked atop the upstanding mount, beneath which are other securely connected components that include a leveling assembly in addition to a spherical bearing assembly, an extensible mast assembly, a battery pack, and a base assembly that includes, or can be securely lockably clamped onto, a massive concrete barrier segment such as is commonly called a "k-rail."
Figure 2:
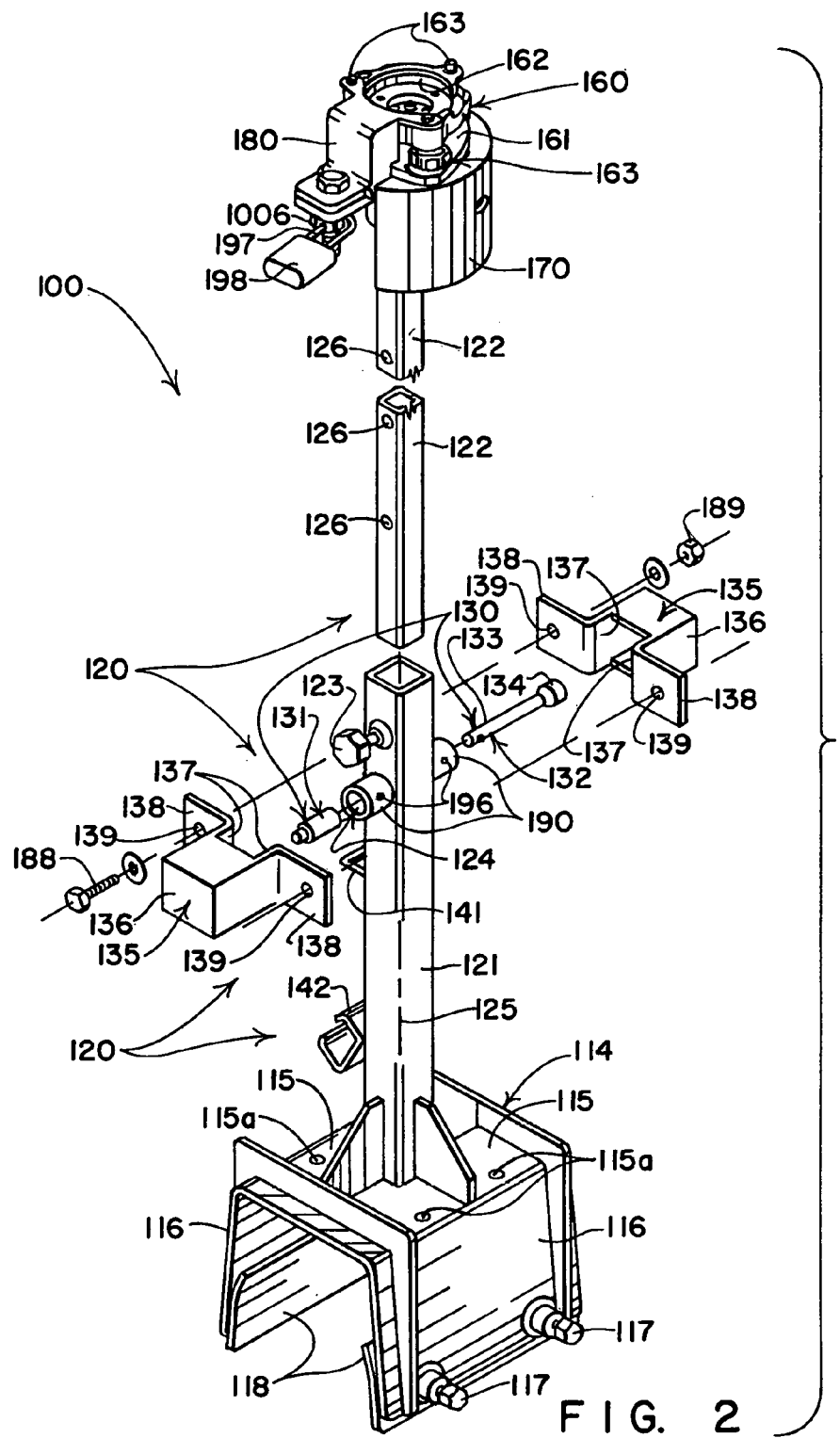
FIG. 2 is an exploded perspective view showing most of the components of the upstanding mount assembled, but with an upper component of the mast assembly foreshortened and disassembled from a lower component of the mast assembly, and with other components of the mast assembly separated—including components of a commercially purchased locking hitch pin assembly and a pair of identical covers that are configured to shroud opposite end regions of the locking hitch pin assembly.

Referring to FIGS. 1 and 2, an upstanding mount that embodies features of a preferred practice of the present invention is indicated generally by the numeral 100. Shown in FIG. 1 atop the upstanding mount 100 is a compact piece of electronic equipment, referred to hereinafter as a "costly device 1000," which provides an example of such costly devices as are intended to be adjustably supported at selected above-ground levels by the upstanding mount 100 which can be moved (typically by gasoline or diesel powered equipment of the type commonly in use at excavation and construction sites) from one temporary location to another, and is intended to support the costly device 1000 in a theft resistant, disassembly resistant, tamper resistant, and relatively stable manner.

Figure 4:
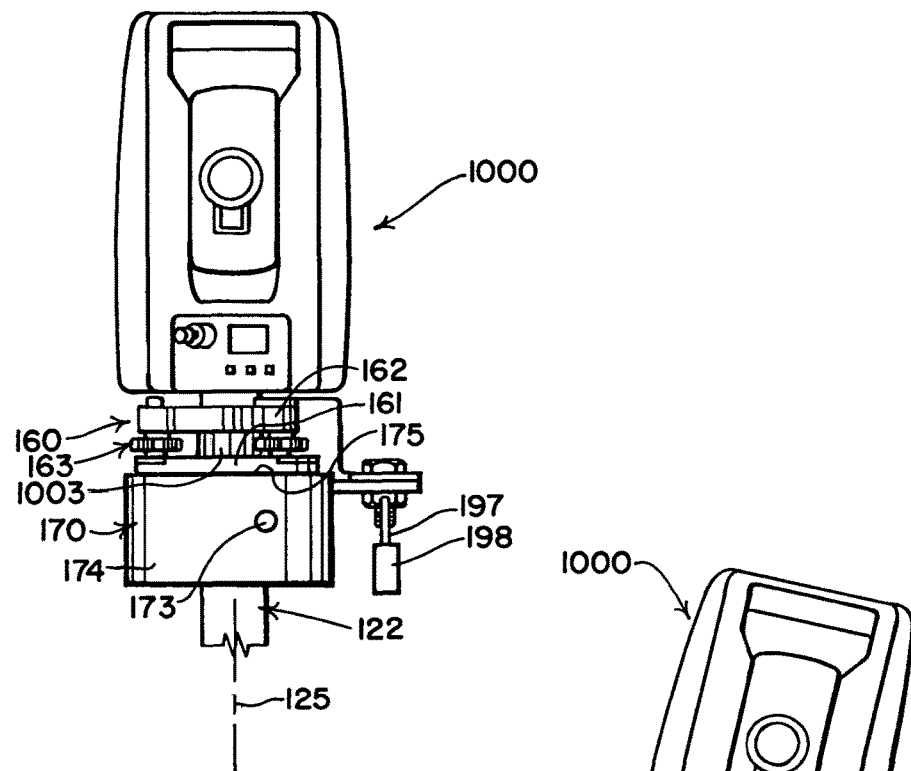
FIG. 4 is a front view of the costly device shown mounted atop a commercially purchased leveling assembly of the mount, beneath which is a generally cylindrical skirt assembly that surrounds and shrouds a spherical bearing situated above telescopically extensible sections of the mast assembly of the upstanding mount.
Figure 5:
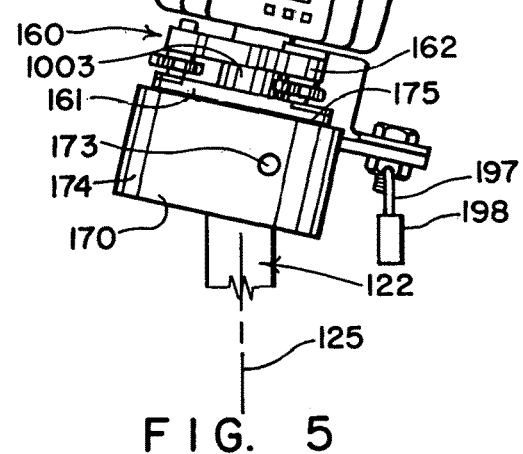
FIG. 5 is a front view similar to FIG. 4, but illustrating how the spherical bearing permits the generally cylindrical skirt assembly, the leveling assetboy, and the costly device to tilt relative to an upstanding, longitudinal axis of the telescopically extensible mast assembly.

Thimble Navigation Limited of Subnormal, Calif., and other entities, offer for sale a variety of costly devices of the type that are desirably supported at above-ground heights at temporary locations that would be well served if supports such as the upstanding mount 100 were to be provided for these systems or units. In addition to the Total Station sold by Thimble that is depicted in FIGS. 1, 4 and 5, Robotic Leveling devices disclosed in Thimble U.S. Pat. Nos. 8,720,074 and 8,537,216 are examples of other such costly devices. These patents also disclose the use of leveling assemblies of the general type depicted herein and designated by the numeral 160. Thimble and others skilled in the art often refer to leveling assemblies of the type indicated herein by the numeral 160 as "Tri-Bracket assemblies" which are bottom-threaded to receive cap screws that are typically about ⅝ inch in diameter and carry standard American threads—although similar Tri-Bracket assemblies apparently also are available that carry metric threads.

Taken together, the upstanding mount 100 and the costly device 1000 provide an apparatus 1010 of the type to which the present invention generally relates. As it is depicted in FIG. 1, the upstanding mount 100 includes the several components that are shown in greater detail in others of the accompanying drawings—except that FIG. 1 shows only an upper portion of a massive concrete barrier segment (or "k-rail") 111 that is depicted more completely in FIG. 3; and, FIG. 1 does not show a cylindrical skirt assembly 170 that is depicted in FIGS. 2, 4-6 and 8.

Figure 3:
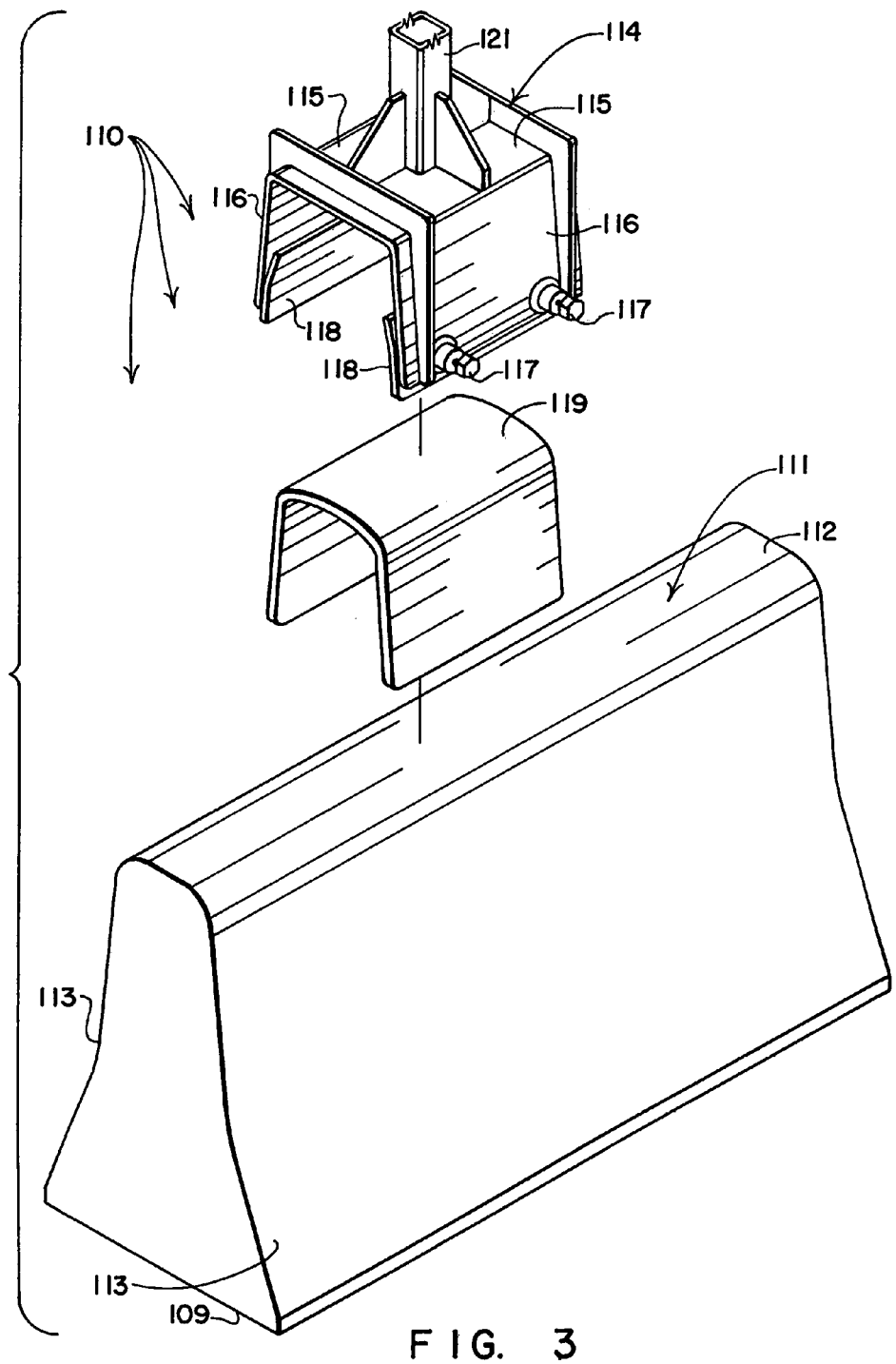
FIG. 3 is an exploded perspective view mainly showing preferred components of the base assembly of the upstanding mount.
Figure 8:
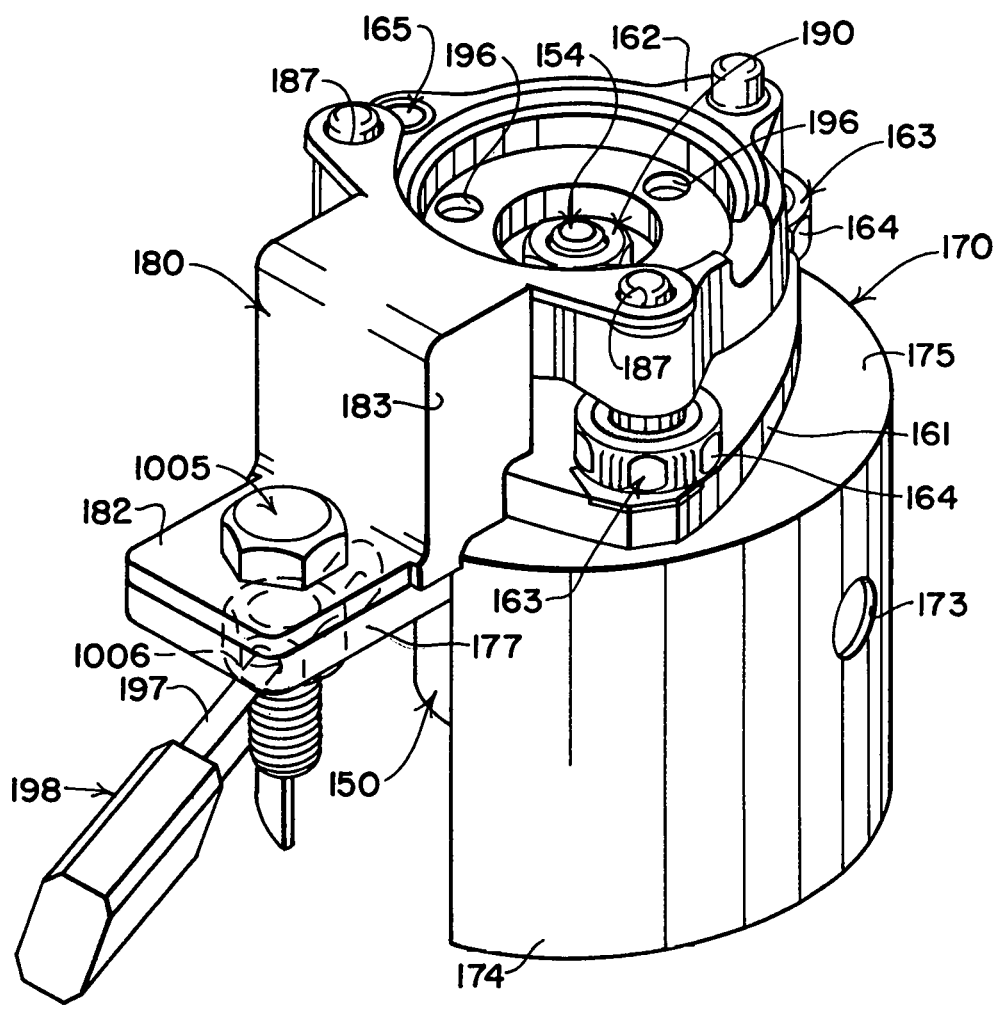
FIG. 8 is a perspective view showing the components of FIGS. 6 and 7 assembled, and with a padlock extending through aligned holes formed through the lockable cap screw and nut to lock the cover plate in place on the upstanding mount.
Figure 9:
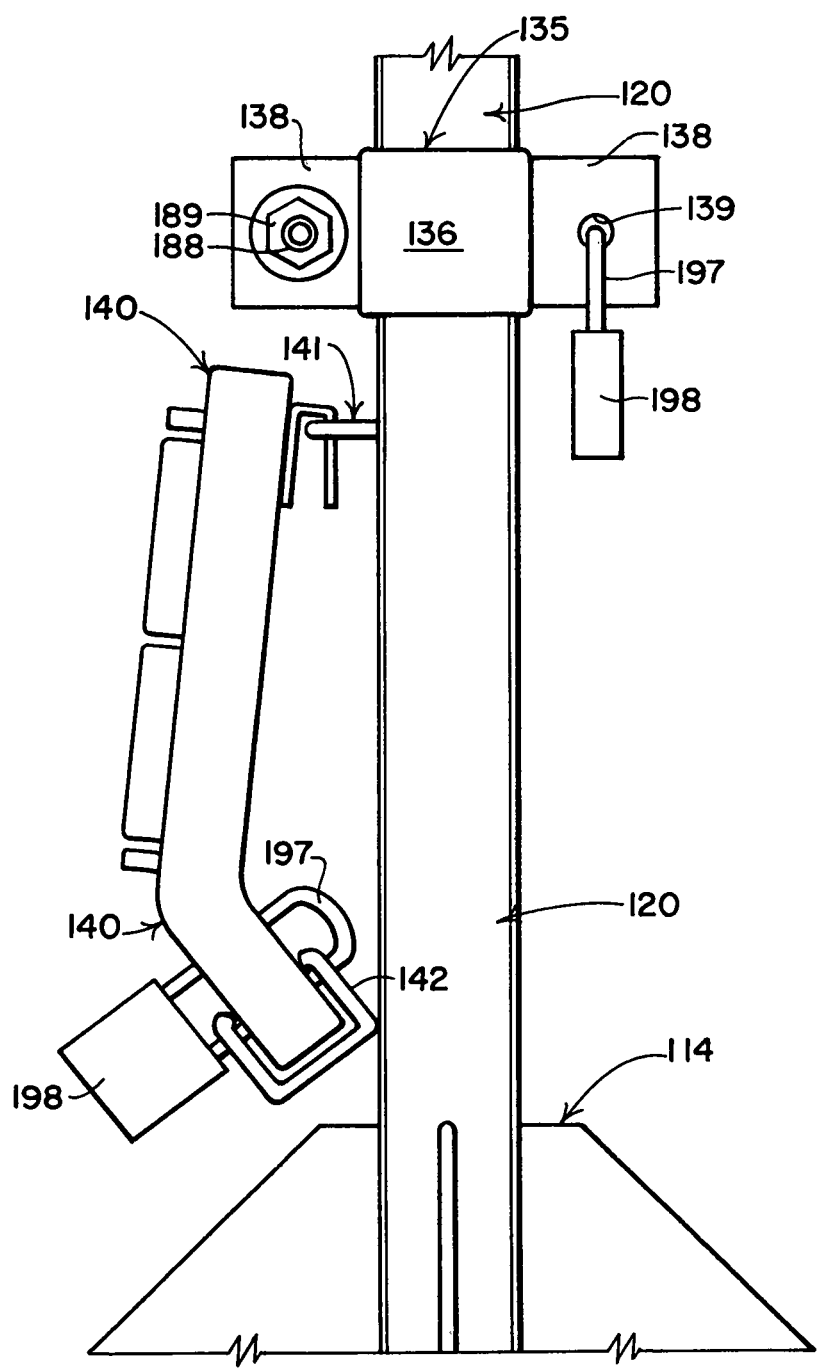
FIG. 9 is a front view of a part of the lower mast component, showing a battery pack padlocked to the mast, and showing one of two identical cover plates that reach around a perimeter of the lower mast component to shroud opposite end regions of the locking hitch pin assembly shown in FIG. 2.
Figure 10:
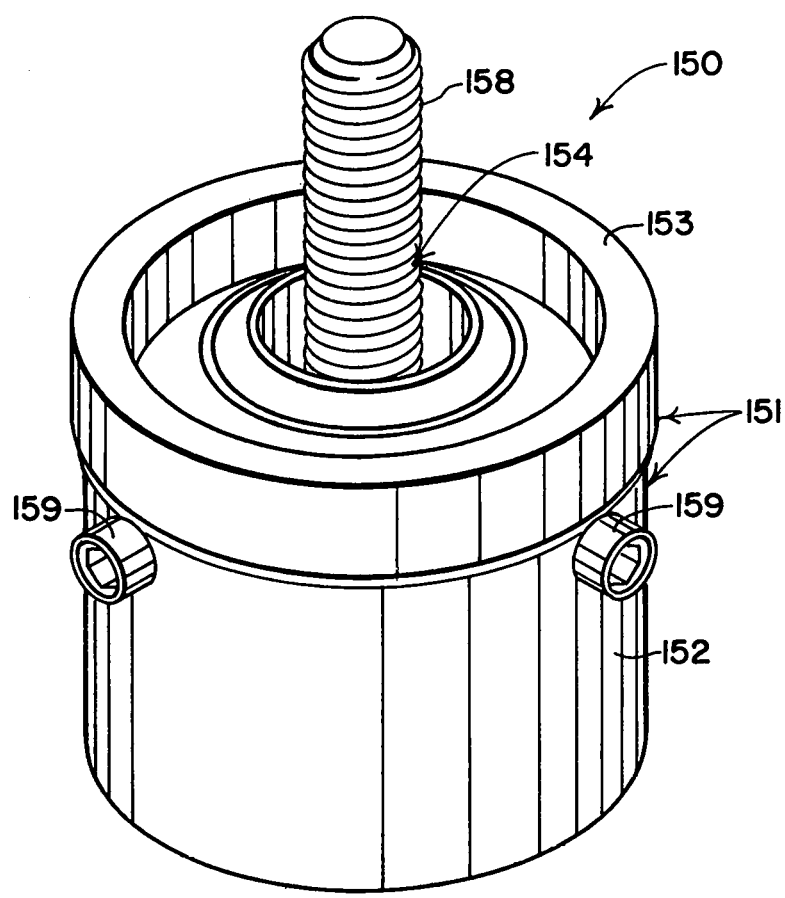
FIG. 10 is a perspective view of assembled components of the spherical bearing assembly.

Some of the components of the upstanding mount 100 include: a base assembly 110 (preferred components of which are best shown in FIG. 3); a telescopically extensible upstanding mast assembly 120 (components of which are best shown in FIG. 2); a commercially purchased locking hitch pin assembly 130 which, together with a pair of covers 135 (all shown in FIG. 2) maintain selected extensions of components of mast assembly 120); a commercially purchased battery pack 140 locked to the mast assembly 120 (as is shown in FIGS. 1 and 9); a spherical bearing assembly 150 (components of which are best shown in FIG. 10); a commercially purchased leveling assembly 160 (best shown in FIGS. 6 and 7) that is securely connected to the spherical bearing assembly 150 (by components best shown in FIG. 7) and which has a control knob 185 (shown in FIGS. 6 and 7) that is shrouded by a protective cover 180 (shown in FIGS. 6 and 8); the previously mentioned cylindrical skirt assembly 170 (best shown in FIGS. 6 and 8); and tubular collars 190, 192 (shown in FIGS. 12-13 and 14-15, respectively) that preferably are used at various locations on the upstanding mount 100 to protectively shroud exposed fastener formations and the like to deter tool engagements with, and disassembly attacks on, the upstanding mount 100.

As will be explained in the pages that follow: 1) the major components enumerated just above are assetbled to provide an upstanding mount 100 that is well suited to securely support the costly device 1000 or similar equipment; 2) the weight of the massive concrete barrier segment 111 (and the weight of heavy components of the upstanding mount 100) enhances stability by compacting disturbed soil at locations where the upstanding mount 100 is positioned temporarily, and combines with the unwieldily configuration of the extended, upstanding mast structure to effectively deter would-be "snatch and grab" thieves; 3) the many lock-together components of the base and mast assemblies 110, 120 combine with the other shrouded and/or lockable connections of the apparatus 1010 to deter disassembly attacks as an approach to acquiring possession of the costly device 1000 or other equipment supported atop the upstanding mount 100; 4) the novel configuration, secure construction and shrouding of components of the spherical bearing assembly 150 permits the costly device 1000 carried by the mount 100 to be tilted, swiveled, leveled and locked in desired orientations or attitudes even if a longitudinal axis of the upstanding mast assembly 120 deviates significantly from true vertical; and, 5) the many other security features of the upstanding mount 100 (including the generally cylindrical skirt assembly 170, the protective cover 180 and such other shrouds, covers and lockable components as are disclosed herein) combine to enable the upstanding mount 100 to adjustably support the costly device 1000 at selected above ground heights, with good stability, and in a superior tamper-resistant, disassembly-resistant and theft-resistant manner, at temporary outdoor locations that often are left unguarded where upstanding mounts of the type disclosed herein are utilized to support a variety of costly devices.

Before turning to a more detailed description of components of the upstanding mount 100, it merits mention that a few minor but deliberate inconsistencies exist insofar as what is shown in FIGS. 1, 2 and 9. To prevent a few of the mast-assembly-connected components that are shown in FIGS. 1, 2 and 9 from blocking the depiction of others of the mast-assembly-connected components, a few of the mast-connected components are moved either up or down the mast assembly 120, or are turned a quarter-turn about the upwardly extending longitudinal axis 125 of the mast assembly 120. This minor repositioning of only a few of the mast-connected components in no way changes the configuration or function of the differently positioned components shown in FIGS. 1, 2 and 9.

Referring to FIG. 3, the base 110 is preferably assembled from components that include (or are connectable to) the relatively massive upstanding concrete barrier segment 111, and a saddle-shaped support assembly 114. The massive barrier segment (or k-rail) 111 is typically three feet or more in height, may be several feet in length, and preferably weighs at least nearly a thousand pounds—and, indeed, preferably weighs more. The heavy nature of the barrier segment 111 (together with other heavy components of the upstanding mount 100) enables the usually relatively flat bottom surface 109 of the barrier segment 111 to compress, and often to thereby stabilize, disturbed and perhaps stirred-up soil such as may underlie the massive barrier segment 111 where it is temporarily positioned to support the costly device 1000 at a sequence of typically out-of-the-way locations.

The massive concrete barrier segment 111 shown in FIG. 3 (but only partially shown in FIG. 1) is of a type that is commonly positioned end-to-end with other similarly configured concrete barrier segments of various lengths, and used throughout the United States for such purposes as providing divider walls that separate traffic lanes of interstate highways and other busily traveled roadways. The barrier segment 111 has a top wall 112, and has opposed sidewalls 113 that incline away from each other as the sidewalls 113 depend progressively farther away from the top wall 112. Flat portions of the barrier segment's sidewalls 113 located relatively near to the top wall 112 do not diverge (as they extend downwardly) nearly as much as do portions of the sidewalls 113 located farther from the top wall 112.

Also shown in FIG. 3 is an inverted-U shaped saddle-shaped support assembly 114 of a general type de-picked more completely in applicant's U.S. Design Pat. No. D-701,107 issued Mar. 18, 2014, the disclosure of which is incorporated herein by reference. The saddle shape of the support assembly 114 enables it to be positioned atop an upper portion of the massive barrier segment 111.

A top wall 115 of the saddle-shaped support assembly 114 is integrally connected to a pair of side members 116 or side assemblies 116 that depend in spaced relationship so as to extend along associated upper parts of the opposed sidewalls 113 of the barrier segment 111. Each of the depending side assemblies 116 is provided with at least two threaded fasteners 117 that can be turned to move relatively movable components 118 of the depending side assemblies toward and away from associated ones of the opposed sidewalls 113 of the barrier segment 111.

Also shown in FIG. 3 is an inverted U-shaped vibration dampening member 119 that preferably is formed from relatively stiff but still resilient plastics material. The stiff but resilient member 119 can be positioned in a saddle-like manner to overlie an upper part of the barrier segment 111; and, the saddle-shaped support assembly 114 can then be positioned in a saddle-like manner atop the stiff but resilient member 119. Thereafter, when the threaded fasteners 117 are turned to clamp the relatively movable components 118 toward each other, with adjacent parts of the stiff but resilient member 119 clamped tightly against the opposed sidewalls 113 of the concrete barrier segment 111, the saddle-shaped support assembly 114 is quite securely clamped to the massive upstanding barrier segment 111.

If it is desired to further enhance the secure manner in which the saddle-shaped support member 114 is fastened to the upstanding concrete barrier segment 111, holes can be drilled through any of a variety of selected regions of the support member 114 (such as the holes 115a shown in FIG. 2 that extend through the top wall 115). Holes (not shown) can also be drilled through portions of the resilient vibration dampening member 119 and into adjacent parts of the concrete barrier segment 111 to enable conventional concrete-connectable fasteners (not shown) to be installed to mechanically fasten the saddle-shaped support member 114 to the concrete barrier segment 111.

The stiff but resilient nature of the inverted U-shaped member 119 advantageously serves to dampen vibrations of the concrete barrier segment 111 that may result from the nearby operation of bull dozers, road graders and the like, so the upstanding mount 100 is not shaken by the nearby operation of heavy, sizeable excavation equipment and the like—which enables the upstanding mount 100 to continue to provide stable support to the costly device 1000 carried atop the upstanding mount 100 despite the nearby operation of heavy, sizeable equipment.

Although the provision of stiff but resilient material extending between is shown in FIG. 3 as being provided by a single inverted U-shaped member 119, it also is possible to use smaller, typically rectangular, pieces of stiff but resilient material (not shown) that are approximately sized to be interposed between the movable components 118 and associated parts of the sidewalls 113 of the barrier segment 111. Additionally, an appropriately configured piece or pieces (not shown) of stiff but resilient material can be interposed between other parts of the saddle-shaped support assembly 114 and adjacent portions of the concrete barrier segment 111 to further assist in dampening vibrations that might otherwise be transmitted from the barrier segment 111 to the saddle-shaped support assembly 114.

Although the mast assembly 120 is preferably formed from pairs of elongate, tubular, square sections (such as the sections 121, 122 depicted in FIG. 2) where the lower section 121 of two adjacent sections 121, 122 has a cross-section that is larger than the upper section 122, the mast 120 may include one or more pairs of adjacent sections where the larger-smaller relationship of lower and upper sections is reversed—such as is shown in FIGS. 12-15 where the upper section 122 of two adjacent and joined sections 121, 122 has a larger cross-section than the lower section 121.

Although the telescopically extensible mast assembly 120 is preferably formed from pairs of adjacent, tubular, square sections that are sliceable one within another as depicted in FIG. 2, simply by removing and repositioning a locking hitch pin assembly 130 once the sections have been relatively repositioned. However, the mast assembly 120 may alternatively include pairs of adjacent joined sections that are not intended to be so easily moved relative to each other. In this regard, reference is made to FIGS. 12-15 which show two adjacent mast sections 121, 122 that are joined in a fixed relationship by a cap screw (having an exposed, tool-engageable hex head 199) that extends through aligned holes (not shown) formed through the two adjacent telescopically joined mast sections 121, 122.

Regardless of however many sections may form the mast assembly 110, it is preferred that the mast assembly 110 be capable (when its sections all are fully extended) to support the costly device 1000 at a variety of selected heights, with the fully extended mast assembly 110 being capable of supporting the costly device 1000 at a height of preferably at least about 12 feet above ground when the ground engaging surface 109 (FIG. 3) of the concrete barrier segment is in engagement with a ground surface.

There are likely to be many locations on the upstanding mount 100 where tool-engageable fastener formations (such as the cap screw heads 199 shown in FIGS. 12 and 14) are exposed that might render the upstanding mount 100 susceptible to "attack by disassembly"—which refers to an attempt made by would-be thieves to quickly gain possession and control of the costly device 1000 by rapidly disassembling a portion of the upstanding mount 100 in the hope that a disassembled mount portion to which the costly device 1000 is directly attached is not so heavy or unwieldily as to prevent being carried away. Where such tool-engageable fastener formations are exposed in a way that renders the upstanding mount 100 subject to such a disassembly attack, it is desirable to shroud or otherwise restrict access to these and any other exposed tool-engageable fastener formations so they cannot be quickly or easily accessed as part of an "attack by disassembly."

Figures 12, 13:
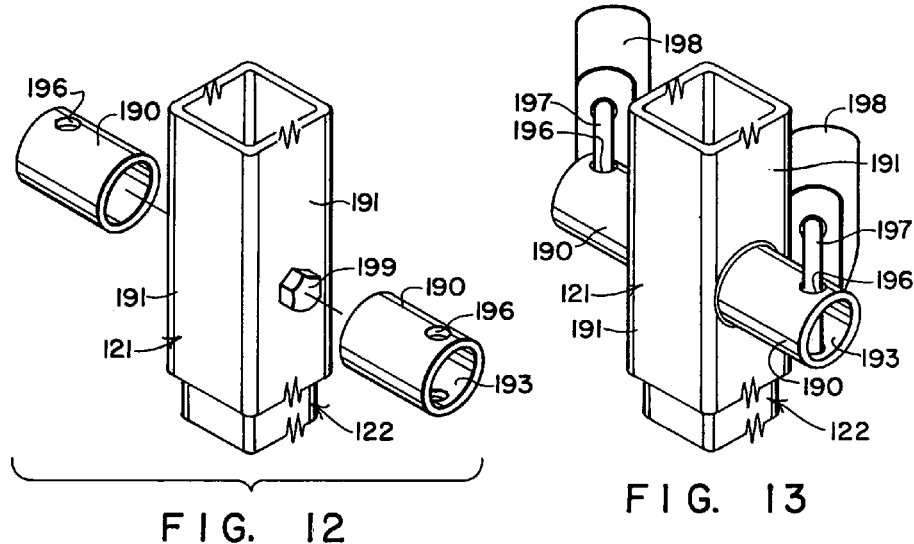
FIG. 12 is an exploded perspective view showing an exposed, tool-engageable fastener formation, and a pair of tubular, generally cylindrical collars that can be welded to opposite sides of a depicted support assembly of the base that is clampable to a massive concrete segment such as the k-rail shown best in FIG. 3.
FIG. 13 is a view of assembled components of FIG. 12 that are padlocked to obstruct tool access to the tool-engageable fastener formation.
Figures 14, 15:
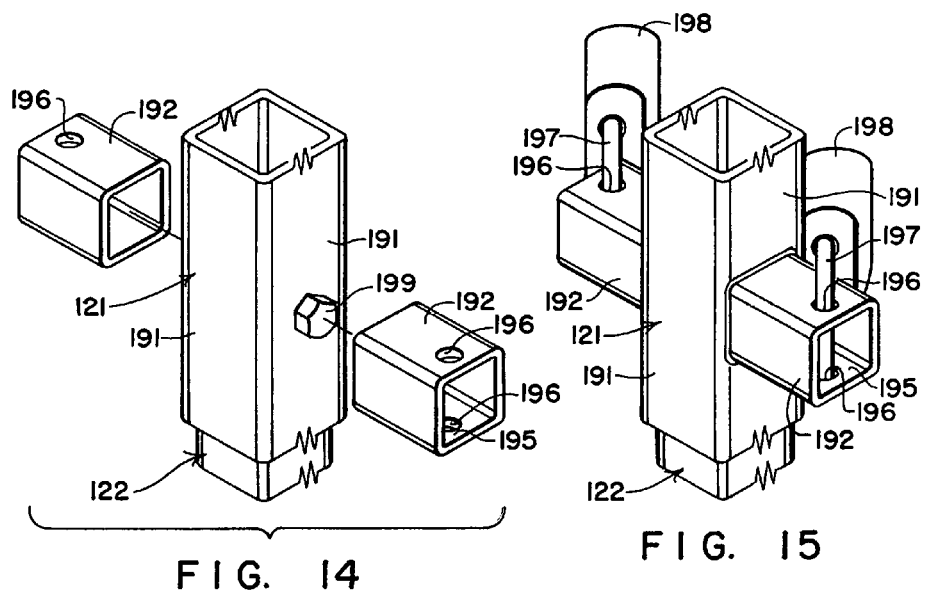
FIG. 14 is an exploded perspective view showing another exposed, tool-engageable fastener formation and a pair of tubular collars having substantially square cross-sections that can be welded to opposite sides of a depicted portion of the mast of the upstanding mount; and, FIG. 15 is an assembly view of the components of FIG. 14 that are padlocked to obstruct tool access to the tool-engageable fastener formation.

Referring to FIGS. 12 and 14, the exposed fastener formation 199 can render the upstanding mount 100 a target for a disassembly attack. If the mast assembly 120 were to be disassembled by removing the cap screw that has the hex head 199, a portion of the disassembled mast 120 having the costly device 1000 still attached thereto might be carried away by thieves intent on gaining possession of the costly device 1000.

Likewise, referring to FIGS. 2 and 3, the exposed fastener formations 117 (namely the hex heads of the threaded fasteners 117) also could conceivably be the subject of a disassembly attack on the upstanding mount 100. If the exposed hex bolt heads of the threaded fasteners 117 were to be engaged by tools and turned to loosen the grip of the movable clamping members 118 on the massive barrier segment 111, this might permit the saddle-shaped support structure 114 (and the accompanying mast structure 120) to be disconnected from the massive barrier segment 111. The weight and configuration of the disconnected components of the upstanding mount 100 might be such that would-be thieves could carry away the disconnected components of the upstanding mount 100 together with the costly device 1000 that would still be connected thereto.

To deter and hopefully prevent such disassembly attacks, the present invention preferably makes generous use of padlockable tubular collars to shroud exposed formations of fastener that might be engaged by tools and loosened or removed as part of a disassembly attack. Such exposed fastener formations as are indicated in FIGS. 2 and 3 by the numeral 117, and in FIGS. 12 and 13 by the numeral 199 are protectively shielded by installing tubular collars of either the generally cylindrical type indicated in FIGS. 12 and 13 by the numeral 190, or of a type having a more square cross-section, as shown in FIGS. 14 and 15 and indicated by the numeral 192.

The collars 190, 192 are selected to have inside diameters or sizes that enable the collars 190, 192 to extend in spaced surrounding relationship to the exposed fastener formations 199 to thereby render the exposed fastener formations 199 engageable and turnable substantially only by such generally tubular tools as conventional sock-keys (not shown) that are of sufficiently small size and thin-walled construction as will permit their being inserted through open end regions 193, 195 of the collars 190, 192, respectively, to deridingly engage the exposed fastener formations 199. In preferred practice, the collars 190, 192 are welded to (or otherwise rigidly connected to) flat surfaces 191 against which the exposed fastener formations are tightened.

The collars 190, 192 are sufficiently lengthy to enable their open end regions 193, 195 to be situated far enough from the flat surfaces 191 so that transversely extending holes 196 can be provided through the sidewalls of the collars 190, 192 at locations relatively near to the open end regions 193, 195 of the collars 190, 192, respectively—locations that are spaced forwardly from the exposed fastener formations 199. To obstruct or deny tool access to the fastener formations 199, shackles 197 of padlocks 198 are extended through the holes 197, and the padlocks 198 are locked in place so that tools can not engage and turn the fastener formations 199 unless and until the shackles 197 of the padlocks 198 are withdrawn from the holes 197.

In FIG. 1, lengthy tubular collars 190 (of the general type shown in FIGS. 12 and 13) are welded onto surfaces of the depending side assemblies 116 of the base assembly 110. The shackles 197 of padlocks 198 are installed through holes in the collars 190 (in the manner shown in FIG. 13) to deny tool access to the hex heads of the threaded fasteners 117. The shrouding of the fasteners 117 by the collars 190, and the presence of the padlocks 198 blocking tool access to the fasteners 117, will deter a disassembly attack.

Referring to FIGS. 1-3, a bottom end region of the lower mast section 121 is securely attached (preferably by welding) to the top wall 115 of the saddle-shaped mounting bracket 114 of the base assembly 110. As is best shown in FIG. 2, the mast sections 121, 122 extend along an upstanding longitudinal axis 125, and have generally square cross-sections that prevent the mast sections 121, 122 from turning about the longitudinal axis 125 to any significant extent. Again, the mast sections 121, 122 have cross-sections that permit the smaller upper or uppermost component 122 to slide freely and smoothly downwardly into, and upwardly out of, the relatively larger lower or lowermost mast component 121.

So that the telescopically extensible mast sections 121, 122 are not so loose as to rattle one within another, a threaded fastener that carries an enlarged and easily grasped knob 123 (shown in FIGS. 1 and 2) is carried in threaded passage formed through a sidewall portion of the lower section 121. The knob 123 can be turned to tighten the associated fastener into engagement with an outer surface of the upper section 122.

So the telescopically extensible mast sections 121, 122 can be locked in a variety of relative positions that cause the costly device 1000 to be supported at various selected above ground heights, the lower mast section 121 is provided with a transversely extending passage 124 that (as shown in FIG. 2) has its end regions shrouded by tubular collars 190 (of the type described previously). The upper mast section 122 is provided with a plurality of spaced, transversely extending passages 126 which can be selectively aligned, one at a time, with the passage 124 formed through the lower mast section 121, by moving the upper mast section 122 relative to the lower section 121.

A commercially purchased locking hitch pin assembly 130 of the general type shown in FIG. 2 is used to retain the relatively movable mast sections 121, 122 at a selected height where the transversely extending passage 124 of the lower section 121 aligns with a selected one of the transversely extending passages 126 of the upper section 122. If, as mentioned above, a plurality of pairs of inner and outer mast sections 121, 122 are employed to define the telescopically extensible mast assembly 120, then a plurality of locking hitch pin assemblies 130 are used to connect the relatively movable inner and outer sections of each pair. The presence of the locking hitch pin assemblies 130 preferably is supplemented by use of collars 190 (as shown in FIG. 2) that shroud opposite end regions of the locking hitch pin assemblies 130—and may be further supplemented by either the use of such padlocks 198 as are depicted in FIGS. 13 and 15, or by such covers 135 as are depicted in FIG. 2, as will be explained shortly.

Several entities offer locking hinge pin assemblies for sale. The locking hinge pin assembly 130 shown in FIG. 2 is of a type disclosed in U.S. Pat. Nos. 6,619,078 and 6,813,981 issued Sep. 16, 2003 and Nov. 9, 2004, respectively, to Mark H. Reuse, the disclosures of which are incorporated herein by reference. Locking hitch pins that embody other configurations and features also can be used to lockably connect the mast sections 121, 122—and other pairs of relatively movable mast sections if the mast 120 includes additional sections—as those who are skilled in the are will readily understand.

Referring to FIG. 2, the locking hitch pin assembly 130 includes a short, relatively large diameter cap component 131, and a more lengthy pin component 132 that has an enlarged diameter head 134 of substantially the same diameter as the cap component 131. A small diameter portion 133 of the lengthy pin component 132 is inserted through aligned ones of the transversely extending passages 124, 126 formed through the mast sections 121, 122, respectively, whereafter the shorter cap component 131 is snapped onto (in locking engagement with) an end region of the small diameter portion 133 of the pin component 132. When the cap component 131 is in locking engagement with the pin component 132, a suitably configured key (not shown) must be inserted into the cap component 131, and turned, to release the cap component 131 from the pin component 132.

The collars 190 that shroud opposite end regions (e.g., the cap component 131 and the head 134) of the installed locking hitch pin assembly 130 have inner diameters that closely but loosely receive the cap component 131 and the head 134 of the pin component 132. These collars 190 can be made only slightly longer than is needed to fully shroud from view end regions of the installed locking hitch pin assembly 130. Alternatively, the collars 190 that shroud opposite end regions of the installed locking hitch pin assembly 130 can be made long enough so transversely extending holes 196 can be formed through the collars 190 to enable the shackles 197 of padlocks 198 to be installed therethrough, in a manner shown in FIG. 13.

If the collars 190 are made only long enough to shroud from view opposite end regions of a locking hitch pin assembly 130 installed to lock together the mast sections 121, 122, it is preferred that protective covers 135 of the type shown in FIG. 2 be installed that shroud and restrict access to the collars 190—and that hide from view the locking hitch pin assembly 130. Although the locking hitch pin assembly 130 is really quite adequate in and of itself to securely connect the lowermost mast component 121 to the uppermost mast component 122, the covers 135 that shroud from view all portions of an installed locking hitch pin assembly 130 will provide an additional deterrent to would-be thieves if they mount a disassembly attack on the upstanding mount 100. Thieves may perhaps expend rather a sizable amount of time attempting to remove the covers 135—only to eventually discover, to their likely dismay, the presence of the locking hitch pin assembly 130 which continues to securely retain the mast components 121, 122 in tightly connected assembly.

The covers 135 shown in FIG. 2 are identical one to another, and preferably formed quite rigidly from steel. A box-like main portion 136 of each of the covers 135 is sized and configured to closely fit onto, and to almost completely shroud from view the collars 190. Each of the box-like main portions 136 has a pair of integrally formed extensions 137 that have integral wings 138 that are provided with holes 139 extending therethrough. When the covers 135 are installed to shroud the collars 190 shown in FIG. 2, the extensions 137 of one of the covers 135 reach toward the extensions 137 of the other of the covers 135, and the wings 138 of one of the covers 135 engage and extend along the wings 138 of the other of the covers 135, with the holes 139 defined by the wings 138 of one of the covers aligning with the holes 139 defined by the wings 138 of the other of the covers 135. The shackle 197 of a padlock 198 can be inserted through one of the sets of aligned holes 139 is shown in FIG. 9—which is sufficient to keep both of the tight fitting covers 135 in place on the collars 190. However, for good measure, a cap screw 188 shown in FIG. 2 can be inserted through the other set of aligned holes 139 and secured by the depicted hex nut 189.

The presence of the innocent-looking cap screw 188 and nut 189 installed on the mated covers 135 can help to encourage would-be thieves to spend their time trying to remove the covers 135 if they want to try a disassembly attack on the upstanding mount 100. They will quickly find, however, that the tight-fitting covers 135 are really quite difficult to pry off of the collars 190 when even just one padlock 197 is in place—and, if, by a stroke of good luck, they are able to remove the covers 135, they will find, to their dismay, that the telescopically extensible mast sections 121, 122 (and any other pairs of mast sections that may be similarly coupled) are still held in place by the presence of locking hitch pin assemblies 130.

An advantage that can result from providing the mast assembly 120 with a plurality of somewhat lengthy telescopically extensible sections is the resulting capability to position the costly device 1000 at a relatively high above-ground levels so the costly device 1000 is hopefully held out of range of being clubbed by a ball bat swung with forceful frustration by an enraged would-be thief who may have invested more time than intended in a failed disassembly attack on the upstanding mount 100.

Referring to FIGS. 1 and 9, the battery pack 140 is a commercially purchased unit such as is sold by the aforementioned Thimble Navigation to provide power to such costly devices 1000 as a Thimble-supplied Total Station, which is depicted in FIGS. 1, 4 and 5, which can wireless's monitor and at least partially control bulldozers, road graders and other excavation and construction equipment that carry appropriate receivers.

As can be seen in FIGS. 2 and 9, the lower mast section 121 is provided with an upper bracket 141 of hoop-shaped configuration, and a lower bracket 142 of generally U-shaped configuration. The brackets 141, 142 are designed to permit the commercially available battery pack 140 (or a similar unit available from other entities) to be hung onto the lower mast section 121. The lower bracket 142 also is configured so that a lower portion of the battery pack 140 can be padlocked to the lower mast section 121 as depicted in FIG. 9, by a padlock 198 having a shackle 197.

The battery pack 140 is designed to receive a plurality of rechargeable lithium ion batteries 148, or the like. Inasmuch as theft of the relatively expensive rechargeable batteries 148 has become a vexing problem, thought has been given to providing either the battery pack 140 and/or the batteries 148 with alarms that will sound loudly when a battery 148 is removed in an unauthorized manner. Likewise, the unnoticeable inclusion of alarms and/or tracking devices on or within the costly devices 1000 or even on or within items as small as the batteries 148 has been considered to aid efforts by authorities to intercept the efforts of thieves.

Figure 11:
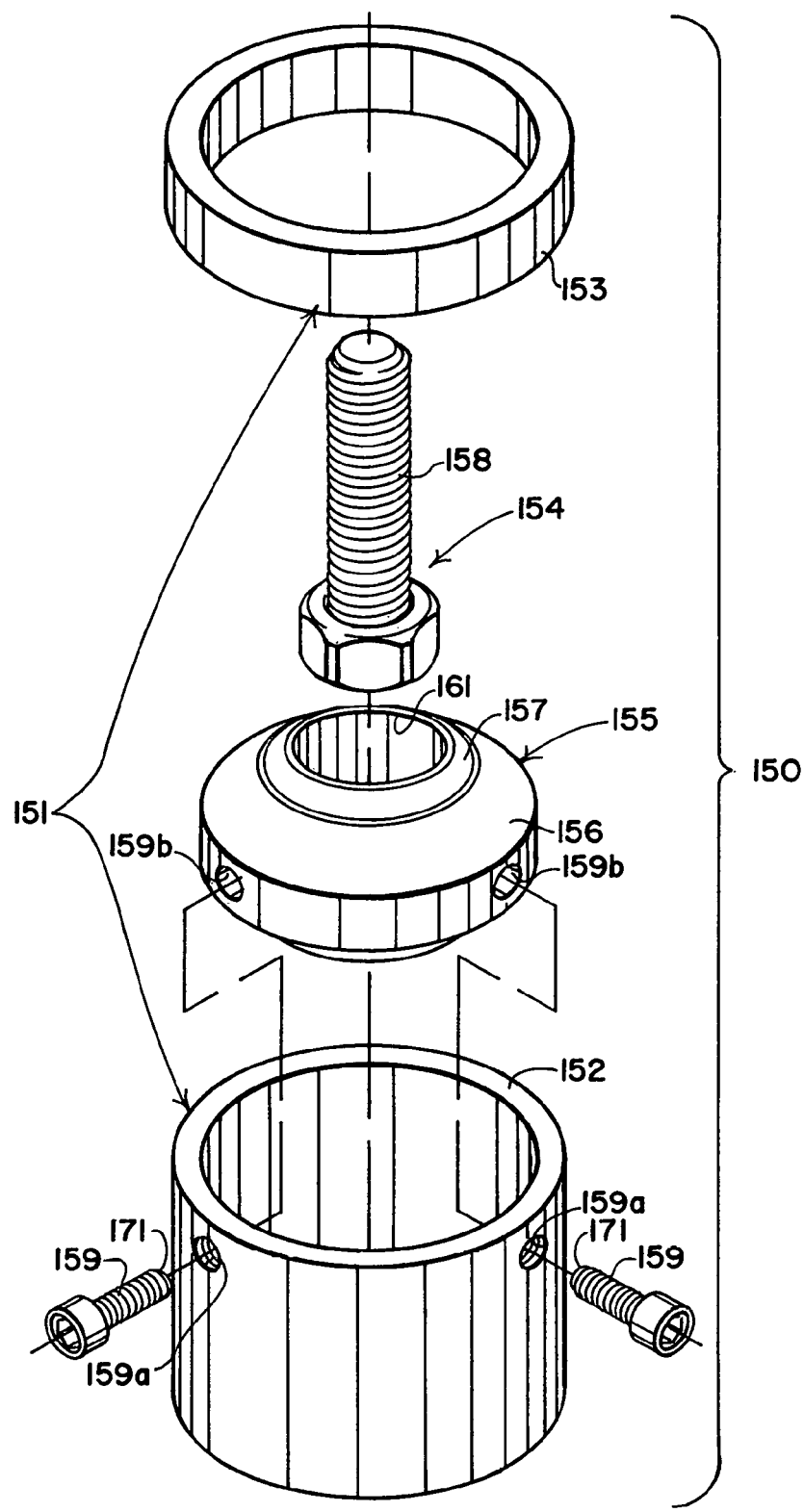
FIG. 11 is an exploded perspective view showing components of the spherical bearing prior to assembly.

Referring to FIGS. 1, 10 and 11, the spherical bearing assembly 150 includes a tubular housing 151 that mounts a commercially purchased spherical bearing 155 best shown in FIG. 11. As can be seen in FIG. 11, the tubular housing 151 includes a lower tubular component 152 and an upper annular component 153 that, as can be seen in FIG. 10, are rigidly connected (preferably by welding). As can also be seen in FIG. 11—and, as will be recognized by those skilled in the art—the conventional, commercially available spherical bearing 155 has an annular housing or exterior member 156 that surrounds and mounts a spherical interior member 157 so the interior member 157 can swivel freely within the confines of the annular housing 156. The exterior surface of the annular housing 156 of the spherical bearing 155 is securely gripped by the tubular housing 151, and does not turn or otherwise move relative to the tubular housing 151.

A high strength cap screw 154 has a head that extends into and is welded in place within a passage 161 that extends centrally through the interior of the spherical interior member 157. When the components just ensuerated are assembled in the manner shown in FIG. 10, the cap screw 154 will be seen to have an upstanding threaded region 158 to which other components of the upstanding mount 100 can be connected. Whatever may be connected to the upstanding threaded region 158 of the cap screw 154 will be permitted, by the spherical bearing assembly 150, to swivel relative to the upstanding longitudinal axis 125 of the mast assembly 120.

A significant advantage of the construction of the spherical bearing assembly 150 is that, when the spherical bearing assembly 150 is welded or otherwise securely and rigidly mounted atop the mast assembly 120, the threaded region 158 of the cap screw 154 can not only swivel freely relative to the surrounding components of the spherical bearing assembly 150, but also can tilt by as much as a full thirty degrees relative to the upstanding longitudinal axis 125 of the mast assembly 120. This explains why the leveling assembly 160 (that is connected to the threaded region 158 of the cap screw 154 as will be explained), and the costly device 1000 (that is connected to the leveling assembly 160 as also will be explained) can swivel and tilt by as much as thirty degrees relative to the upstanding longitudinal axis 125 of the mast assembly 120.

In essence, what the spherical bearing assembly 150 provides is a gamble assembly 150 that enables whatever is connected to the interior member 157 (which has a generally spherical outer surface) an opportunity to tilt and swivel—to gamble—about an imaginary center point of the interior member 157 which is located along the imaginary upstanding longitudinal axis 125. The tilt capability just described that is provided by the spherical bearing assembly 150 is illustrated in FIG. 5 where the leveling assembly 160 and the costly device 1000 are shown tilted significantly relative to the upstanding longitudinal axis 125 of the mast assembly 120. In FIG. 4, these components are shown in an untitled attitude relative to the axis 125—which means that these components extend in planes that are substantially perpendicular to the upwardly extending longitudinal axis 125.

So that the leveling assembly 160 and the costly device 1000 can be retained in any orientation to which these connected components have been tilted relative to the longitudinal axis 125 of the mast assembly 120, threaded fasteners such as set screws 159 or the like (shown in FIGS. 1, 10 and 11) are provided to enable the interior member 157 of the spherical bearing to be retained—basically to be locked—in any of the orientations to which the interior member 157 and such components as are connected to the upstanding threaded region 158 of the cap screw 154) can be swiveled or tilted.

The set screws 159 are preferably at least three in number (only two can be seen in FIGS. 1, 10 and 11), are preferably equally spaced, and preferably extend radially relative to the axis 125. Referring to FIG. 11, the set screws 159 are threaded into threaded holes 159a defined by the lower tubular component 152, and extend through holes 159b formed through the outer component 156 of the spherical bearing assembly 155, and have inner end regions 171 (FIG. 11) that can clamp against the spherical exterior surface of the interior component 157 of the spherical bearing 155. The set screws 159 may carry jam nuts (not shown), and have heads that may be configured to receive Allen wrenches, or can have heads that require Tory wrenches or other so-called "security tools" to turn.

To shroud the heads of the set screws 159 from view, and to diminish the possibility that the set screws 159 will be loosened or otherwise tampered with by would-be thieves, the previously mentioned generally cylindrical depending skirt assembly 170 substantially surrounds the spherical bearing assembly 150 at a distance spaced radially outwardly therefrom. Holes 173 (shown in FIGS. 4-6 and 8) are formed through the generally cylindrical depending wall 174 of the skirt to permit lengthy Allen wrenches or other appropriately lengthy tools to be extended therethrough to engage and turn receiving formations in the heads of the set screws 159.

Though would-be thieves may attempt a disassembly attack on the upstanding mount 100 by removing the somewhat difficult to access set screws 159, removing the set screws 159 will not result in any disassembly of other components of the spherical bearing assembly 150. Removal of the set screws 159 will only serve to loosen the interior member 157 of the spherical bearing 155 to thereby permit the leveling assembly 160 and the costly device 1000 to swivel and tilt freely relative to the longitudinal axis 125 of the mast assembly 120. As such, the provision of the set screws 159 is quite in line with how other elements of the upstanding mount 100 are deliberately constructed—with an eye to providing at least a few components of the upstanding mount 100 that may suggest they are open to attack, but which, in fact, may prove to be quite resistant to a disassembly attack.

Figure 6:
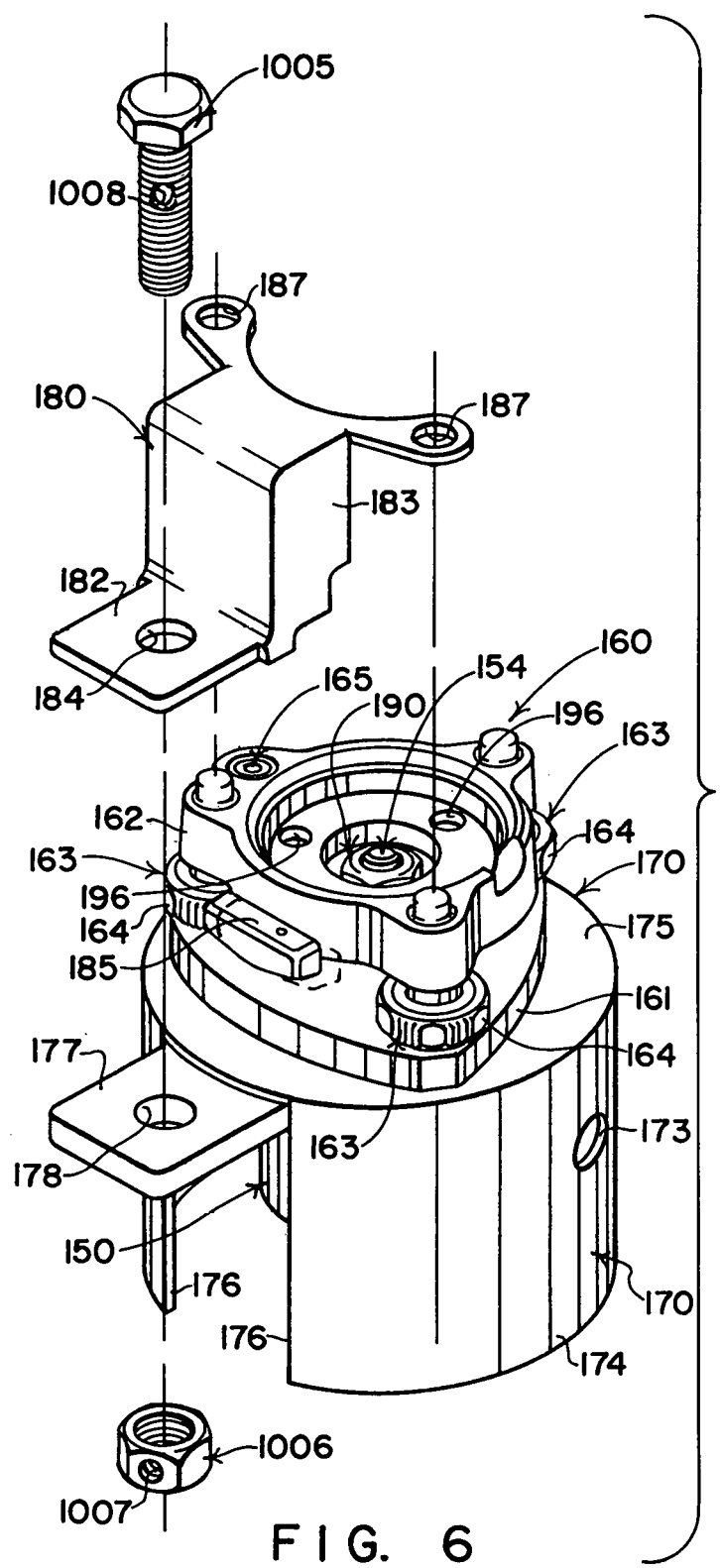
FIG. 6 is an exploded perspective view showing the generally cylindrical skirt assembly, the leveling assembly, and a cover plate that can receive a lockable cap screw and nut to enable the cover plate to clamp onto the leveling assembly situated above the generally cylindrical skirt assembly to shroud a control knob that could otherwise be used to release the costly device from the leveling assembly, with the cover plate, when locked in place, also serving to even more securely hold the leveling assembly in place atop the cylindrical skirt assembly.

Referring to FIG. 6, the generally cylindrical skirt assembly 170 is a welded steel structure formed from the previously mentioned cylindrical depending skirt 174, a round or circular top wall 175, and a relatively thick steel bar 177 that extends radially relative to the axis 125 through a space between ends 176 of the curved sidewall member 174. A hole 178 is formed through an outer end region of the thick steel bar 177. The round or circular top wall 175 is welded to an upper end of the curved sidewall member 174, and the steel bar 177 is welded to the underside of the top wall 175.

Not shown in the drawings is a hole drilled centrally through the circular or round top wall 175 to receive the upstanding threaded region 158 (FIGS. 10 and 11) of the cap screw 154. Also not shown in the drawings is a hole drilled through an inner end region of the steel bar 177 in alignment with the hole drilled centrally through the top wall 176. These aligned holes enable the welded skirt assembly 170 to be lowered onto the upstanding threaded region 158 of the cap screw 154 that projects upwardly from the spherical bearing assembly 150 to position the skirt assembly 170 to surround (in spaced relationship thereto) and to shroud the spherical bearing assembly 150.

Figure 7:
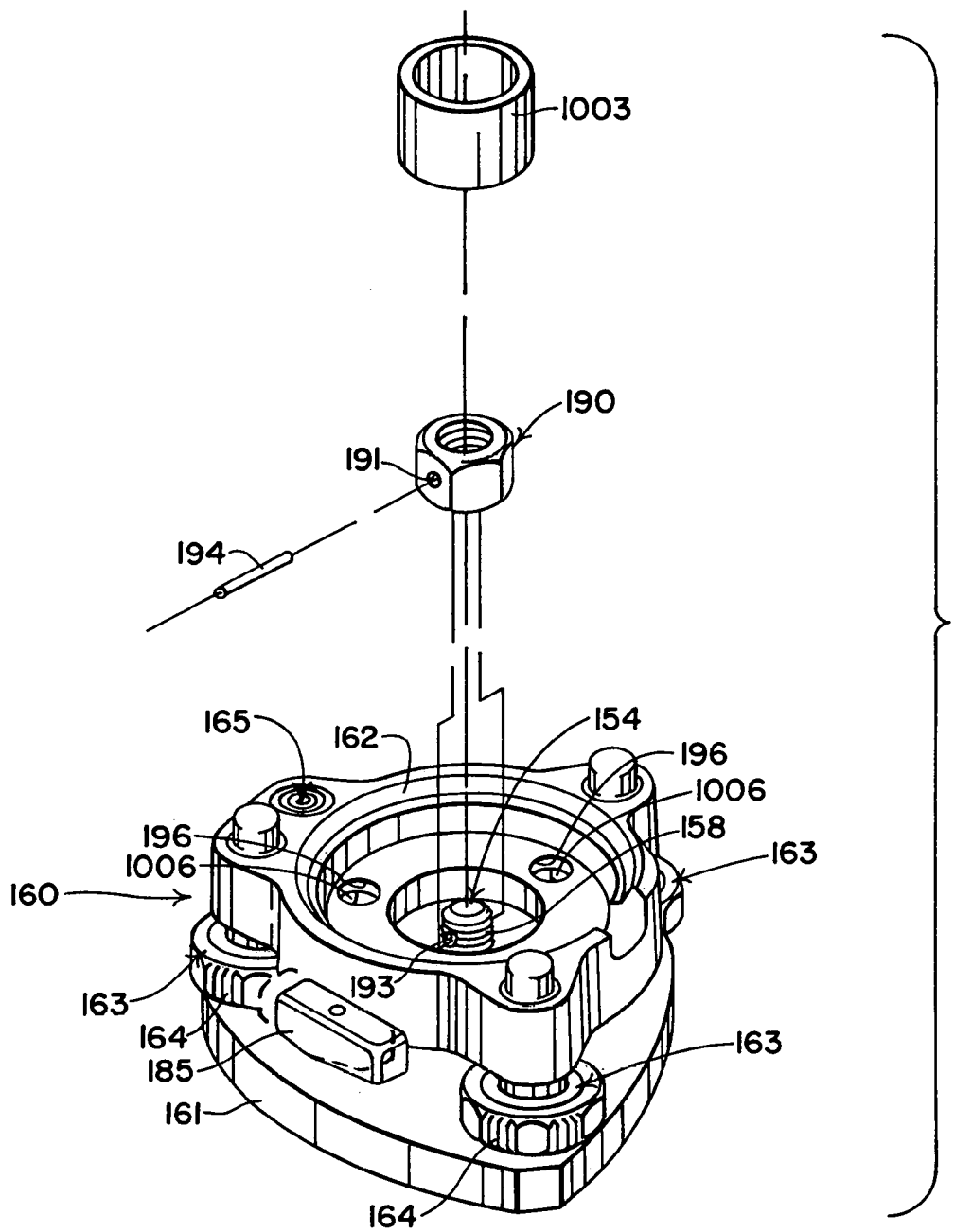
FIG. 7 is an exploded perspective view showing additional components of the upstanding mount that preferably are utilized to securely retain the leveling assembly in place atop the generally cylindrical skirt assembly.

Referring to FIGS. 6-8, the commercially available leveling assembly 160—also known as a Tri-Bracket assembly—will be recognized by those who are skilled in the art as typically having a base plate 161 and a top plate 162 that are connected by three upstanding post assemblies 163. Each of the post assemblies 163 includes a grazeable knob 164 that can be turned to tilt by a few degrees (not a significant range of movement) the orientation of the top plate 162 relative to the orientation of the base plate 161. A small window 165 in the top plate 162 permits a bubble of a conventional circular spirit level to be seen—so the orientation of the top plate 162 can be fine-tuned by only a few degrees to be precisely level regardless of whether the base plate 161 is oriented in a precisely level attitude by the mast assembly 120.

The leveling assembly 160 is secured atop the welded cylindrical skirt assembly 170. In this regard, the base plate 161 of the leveling assembly 160 will be understood to have a centrally located mounting hole (not shown) that is threaded. Although the centrally located, threaded mounting hole is not shown in the drawings, those who are skilled in the art will readily recognize and understand that the threaded, centrally located threaded mounting hole is substantially the same as such threaded mounting holes that are provided in the bottom walls of thousands if not millions of pieces of camera equipment—a threaded hole that can receive an a threaded portion of an upstanding threaded fastener such as the threaded portion 158 of the upstanding cap screw 154 that rigidly couples the leveling assembly 160 to the upstanding threaded region 158 of the cap screw 154 of the spherical bearing assembly 150.

When the base plate 161 of the leveling assembly—or Tri-Bracket as it is often called—is tightened onto the upstanding cap screw 154 of the spherical bearing assembly 150, the welded cylindrical skirt assembly 170 (which has already been lowered onto the upstanding cap screw 154) is clamped in place atop the spherical bearing assembly 150. Thus, when the cap screw 154 of the spherical bearing assembly 150 swivels or tilts, the cylindrical skirt assembly 170, the leveling assembly 160, and the costly device mounted atop the leveling assembly 160 all swivel or tilt in unison.

The swivel-capable, tilt-capable mount that is provided by the spherical bearing assembly 150 provides a means by which the costly device 1000 carried atop the upstanding mount 100 can be brought quickly and easily to a roughly level orientation, and then can be held in this roughly level orientation (by tightening the set screws 159 against the spherical exterior surface of the interior component 157 of the spherical bearing assembly 150). After a roughly level orientation of the leveling assembly 160 has been achieved and this roughly level orientation is retained by the tightened set screws 159, then the entirely separate conventional leveling assembly 160 is used to fine-tune and precisely level the top plate 162 of the leveling assembly 160.

This use of a spherical bearing to accomplish the first step of a two-step leveling of the costly device 1000 is far easier to achieve, and far quicker to accomplish than was the previously used two-step or two-stage leveling technique that called for rough leveling of the leveling assembly 160 by fiddling with how an upstanding mount that supports the leveling assembly 160 is positioned atop often unstable soil, whereafter, the leveling assembly 160 usable to achieve fine tuning of the orientation of the costly device 1000. It is far easier to tilt the upstanding threaded fastener 154 than it is to successively reposition and reset an upstanding mount that supports the leveling assembly 160.

Being able to attend to any needed leveling of the costly device 1000 in two relatively steps that both cam be accomplished relatively quickly saves time, and provides an easier (than was available previously) set of tasks to perform in order to accomplish any needed leveling. Being able to quickly use the spherical bearing assembly 150 to roughly level the costly device 1000 often saves a great deal of time that might otherwise have had to be invested in trying to reposition (time and again) an upstanding mount so the upstanding mount 100 holds the costly device 1000 in a nearly level orientation that, only then, permits the leveling assembly 160 to do fine-tuning of the leveling of the costly device 1000—it being remembered that the leveling capability of the leveling assembly 160 is limited to only a few degrees. Experienced personnel have found that sometimes, use of the spherical bearing assembly 150 to roughly level the costly device 1000 can be accomplished quite accurately with a minimum amount of effort—so that use of the leveling assembly 160 to perform fine-tuning to a more level orientation is not even needed.

Insofar as fastening the leveling assembly 160 in place is concerned, merely tightening the threaded base plate 161 in place atop the cylindrical skirt assembly 170 is not sufficient to properly deter a disassembly attack. More is needed to securely retain the leveling assembly 160 in place atop the upstanding mount 100. In this regard, referring to FIG. 7, a jam nut 190 of hex configuration that has a transversely extending hole 191 formed therethrough is threaded onto the threaded region 158 of the cap screw 154 that extends upwardly from the spherical bearing assembly 150. The jam nut 190 is tightened into engagement with the leveling assembly's base plate 161 (which has already been lowered onto the threaded region 158 of the cap screw 154). Once the jam nut 190 has been tightened into position, a transversely extending hole 193 (FIG. 7) is drilled through the threaded region 158, and a roll pin 194 shown in FIG. 7 is driven through the newly drilled hole 193 and through the hole 191 that extends transversely through the jam nut 190.

To ensure that the roll pin 194 is not driven out of the aligned holes 191, 193 by would-be thieves, a tubular member 1003 shown in FIG. 7 is lowered into the center of the leveling assembly 160 to surround the jam nut 190, and to hide from view not only the presence of the roll pin 194 but also the presence of the jam nut 190. When the costly device 1000 is put in place atop the leveling assembly 160, the presence of the costly device 1000 blocks removal of the tubular member 195 from within the leveling assembly 160.

A feature of the leveling assembly 160 that is sold by the aforementioned entity Trimble Limited is the inclusion within the leveling assembly 160 of a mechanism for connecting and maintaining the connection of the leveling assembly 160 to the costly device 1000 positioned atop the leveling assembly 160. The costly device 1000 has three depending formations (not shown) that extend into three equally spaced holes 196 (two of which are shown in FIGS. 6-8) when the costly device 1000 is set in place atop the leveling assembly 160. These three holes 196 are defined by the top plate 162 of the leveling assembly 160. The previously mentioned control knob 185 (shown in FIGS. 6 and 7) can be turned between a retention position that is shown in FIG. 6 and a release position shown in FIG. 7 to move retention formations 1006 (shown only in FIG. 6) into the regions of the holes 196, as will now be explained.

When the control knob 185 is turned to the retention position of FIG. 6, this movement of the control knob 185 causes retention formations 1006 to move into the regions of the holes 196—and, when the retention formations 1006 are moved into the regions of the holes 196 as shown in FIG. 6, the retention formations 1006 normally are received in notches that are provided in the three depending formation of the costly device 1000 (mentioned above but not shown)—by which arrangement the costly device 1000 is retained atop the leveling assembly 160.

Since the costly device 1000 is not shown in FIG. 6, and since only two of the holes 196 are shown in FIG. 6, only two of the three retention formations 1006 can be seen in FIG. 6. If the costly device 1000 were to be added to what is shown in FIG. 6, neither the holes 196 nor the retention formations 1006 would block any view of the holes 196.

When the control knob 185 is in the release position of FIG. 7, the retention formations 1006 no longer extend into the regions of the holes 196, which permits the costly device 1000 to be lifted off of the leveling assembly 160. This retention and release capability of the leveling assembly 160 that is controlled by the control knob 185 has, until now, been the only means by which the costly device 1000 has been securely retained atop the leveling assembly 160. Since the control knob 185 has normally been exposed to view, the on-board retention mechanism of the leveling assembly 160 has proven to be far too easily used by thieves who quickly learn to take possession of the costly device 1000 simply by turning the control knob 185 which permits the costly device 1000 to be lifted off of the leveling assembly 160.

Referring to FIG. 6, to prevent access by would-be thieves to the control knob 185, the cover 180 is provided which can be locked in place, as shown in FIG. 8, to completely shroud the control knob 185 from view and from being turned. The cover 180 has a box-like central formation 183 configured to fit closely to portions of the welded skirt assembly 150 and to portions of the leveling assembly 160—thus the control knob 185 is completely enclosed.

As can be seen in FIGS. 6 and 8, a pair of holes 187 defined by the cover 180 are configured to receive upper portions of two of the upper parts of the upstanding post assemblies 163. As is best shown in FIG. 6, a projecting part 182 of the cover 180 is configured to overlie the thick steel bar member 177 of the cylindrical skirt assembly 170. A hole 184 is formed through the projecting part 182 of the projecting part 182 that will align with the hole 178 through the thick steel bar member 177 when the cover 180 is installed (as shown in FIG. 8) so the cover 180 cuts off access to the control knob 185.

As can also be seen in FIGS. 6 and 8, a cap screw 1005 is provided to extend through the aligned holes 184, 178. A nut 1006 is provided to thread onto the cap screw 1005. The shackle 197 of a padlock 198 can be installed through a hole 1007 formed through the nut 1006, and aligned hole 1008 formed through the cap screw 1005 to lock the cover 180 in place.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention. It is intended that the claims that follow address such patentable features as are disclosed herein.

What is claimed is:

1. A theft resistant upstanding mount for adjustably supporting at temporary outdoor locations costly equipment likely to be a target for theft, comprising:

a) a base assembly that can be adjusted to rest in a stable manner atop a surface or object that does not necessarily extend in a perfectly horizontal manner;

b) a telescopically extensible, height adjustable mast assembly connected to the base assembly for extending upwardly substantially vertically from the base assembly even if the surface or object on which the base assembly rests does not extend in a perfectly horizontal manner;

c) an upper mounting station connected to and supported by the mast assembly, and being configured to support a first costly equipment device adjacent the upper end region of the mast assembly;

d) a lower mounting station connected to and supported by the mast assembly, and being configured to support a second costly equipment device adjacent the lower end region of the mast assembly; and e) with the upper mounting station including a threaded mount component that extends concentrically along, and is supported by a bearing to be normally turnable about, a predetermined axis to prevent the first costly equipment device from being threaded onto and off of the threaded mount component while the threaded mount is turnable about the predetermined axis to thereby prevent theft of the costly equipment device from the upper mounting station; unless the threaded mount component is prevented from turning about the predetermined axis by rotation control means that also constitutes a component of the upper mounting station that can be used to temporarily prevent turning of the threaded mount component about the predetermined axis to thereby enable the first costly equipment device to be threaded onto the threaded mount component to securely connect the first costly equipment device to the upper mounting station while the threaded mount component is prevented from turning about the predetermined axis, and to thereby enable the first costly equipment device to threaded off of the threaded mount component disconnect the first costly equipment device from the upper mounting station while the threaded mount component is prevented from turning about the predetermined axis, wherein:

the telescopically extensible, height adjustable mast assembly is formed from a plurality of relatively movable components that are capable, when fully extended, of supporting the upper mounting station at a height greater than 12 feet, whereby the size of the upstanding mount, when the mast components are fully extended, provides an unwieldily structure that deters theft by virtue of its height;

one of the relatively movable components extends into and is received within another of the relatively movable components, with a set of alignable holes being formed through the one and another components, and with a lockable, removable hitch pin assembly extending through the alignable holes when aligned to prevent relative movement of the one and another components; and shroud collars are welded to opposed side surfaces of the another component to protectively enclose and limit access to opposite end regions of the lockable hitch pin assembly.

2. The theft resistant upstanding mount of claim 1, with the lower mounting station including:

a) a non-removable component securely connected to the mast assembly and configured to underlie and to extend upwardly closely alongside the second costly equipment device that is to be supported by the second mounting station; and b) a removable component that is lockable or padlockable in place to prevent removal of the second costly equipment device from the lower mounting station until the removable component is unlocked and removed.

3. The theft resistant upstanding mount of claim 1 wherein the second costly equipment device supported by the lower mounting station includes a rechargeable battery.

4. The theft resistant upstanding mount of claim 1 wherein the second costly equipment device supported by the lower mounting station includes a source of electrical power.

5. The theft resistant upstanding mount of claim 1 wherein the base assembly is configured to be releasably connected to at least one massive block of concrete weighing in excess of 100 pounds, whereby the connection of the base assembly to the massive block, and the full extension of the height adjustable mast assembly provides an unwieldily structure that deters theft by virtue of both the weight and size of the theft resistant upstanding mount.

6. The theft resistant upstanding mount of claim 1 wherein at least one pair of the relatively movable components overlap by extending alongside each other at a particular location, and wherein the upstanding mount includes lockable means provided adjacent the particular location for releasably maintaining an overlap of the at least one pair of relatively movable components.

7. The theft resistant upstanding mount of claim 1 including two relatively movable components that have a first set of aligned holes formed therethrough that are secured by a threaded fastener extending therethrough with a nut threaded onto the threaded fastener, with a second set of aligned holes being formed through the nut and the threaded fastener, and with a padlock having a shackle that extends through the second set of aligned holes to thereby secure the fastener, the nut, and the two relatively movable components.

8. The theft resistant upstanding mount of claim 1 wherein the lower mount includes a bracket connected to the mast that is configured to support at least one rechargeable battery.

9. The theft resistant upstanding mount of claim 1 wherein the base assembly includes a saddle shaped support structure configured to overlie and to be securely clamped to opposite sides of an upstanding, massive concrete barrier structure weighing in excess of 100 pounds.

10. The theft resistant upstanding mount of claim 9 wherein the saddle-shaped support structure includes padlockable threaded fasteners that can be turned to clamp the saddle-shaped support structure to the opposite sides of the concrete barrier structure.

11. A theft resistant upstanding mount for supporting two different costly equipment devices each at different vertical heights, including a telescopically extensible upstanding mast having an upper mounting station located near and connected to an upper end region of the mast, and a lower mounting station located near and connected to a lower end region of the mast, with the upper mounting station including a threaded formation extending along an upstanding axis about which the threaded formation is normally turnable unless a rotation control means is operated to prevent the threaded formation from turning about the upstanding axis so that a costly equipment device can be threaded selectively onto and off of the threaded formation, wherein:

at least a chosen one of the mounting stations includes a non-removable component configured to underlie and extend upwardly closely alongside a costly equipment device supported by the chosen mounting station, and a removable component; and the removable and non-removable components have holes formed therethrough that are alignable, and that, when aligned, can receive a shackle of a padlock so that the removable component and the non-removable component can be padlocked together.

12. The theft resistant upstanding mount of claim 11 additionally including a shroud that normally shields the rotation control means from being operated until the shroud is oriented in a particular way that permits access to the rotation control means.

* * * * *